United States Patent [19]

Brown

[11] Patent Number: 4,475,193

[45] Date of Patent: Oct. 2, 1984

[54] POWER LINE CARRIER MULTI TELEPHONE EXTENSION SYSTEM FOR FULL DUPLEX CONFERENCING BETWEEN TELEPHONES

[75] Inventor: William M. Brown, Acton, Mass.

[73] Assignee: Astech, Inc., Bedford, Mass.

[21] Appl. No.: 431,400

[22] Filed: Sep. 30, 1982

[51] Int. Cl.³ .......................................... H04M 11/00
[52] U.S. Cl. .................................. 370/124; 179/2.51; 179/18 BC
[58] Field of Search ................. 370/124, 62; 179/2.51, 179/18 BC; 340/310 R, 310 A

[56] References Cited

U.S. PATENT DOCUMENTS 3,864,521  2/1975  Delong et al. ..................... 179/2.51
3,949,172  4/1976  Brown et al. ...................... 179/2.51
4,058,678  11/1977  Dunn et al. ....................... 179/2.51
4,239,940  12/1980  Dorfman ........................... 179/2.51

Primary Examiner—Douglas W. Olms
Assistant Examiner—Frank M. Scutch, III
Attorney, Agent, or Firm—Hamilton, Brook, Smith & Reynolds

[57] ABSTRACT

In a power line carrier telephone extension system for transmitting electrical signals between the telephone line and an extension telephone over the AC electric power line available at a telephone subscriber's premises, that includes a main station for processing signals between the subscriber's telephone line and power lines and an extension telephone of the system that plugs into the power line, means that provides for a plurality of such extension telephones all of which can place calls to the telephone line, answer calls from the telephone line and conference together in full duplex communication.

33 Claims, 24 Drawing Figures

FIG. 10

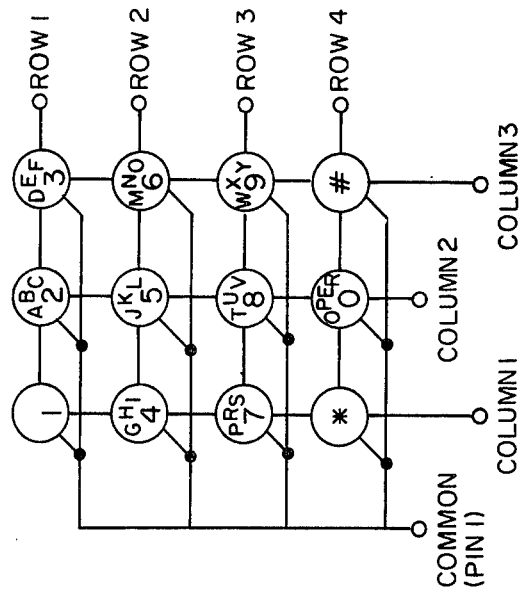
FIG. 14C
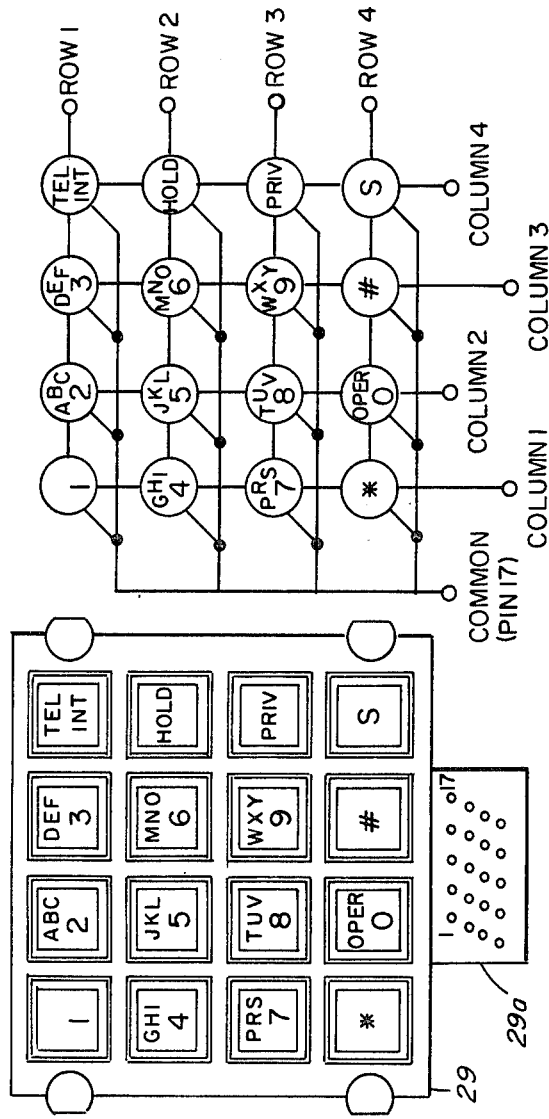
FIG. 14B
FIG. 14A
| TELEPHONE INPUT OUT PUT ARRANGEMENT | |
|---|---|
| OUT PUT PIN NO. | SYMBOL |
| PIN 1 | COMMON |
| PIN 2 | ROW 1 |
| PIN 3 | COLUMN 1 |
| PIN 4 | ROW 2 |
| PIN 5 | COLUMN 2 |
| PIN 6 | ROW 3 |
| PIN 7 | COLUMN 3 |
| PIN 8 | ROW 4 |
FIG. 14E
| DIGITAL INPUT OUT PUT ARRANGEMENT | |
|---|---|
| OUT PUT PIN NO. | SYMBOL |
| PIN 9 | COLUMN 4 |
| PIN 10 | COLUMN 3 |
| PIN 11 | COLUMN 2 |
| PIN 12 | ROW 4 |
| PIN 13 | COLUMN 1 |
| PIN 14 | ROW 3 |
| PIN 15 | ROW 2 |
| PIN 16 | ROW 1 |
| PIN 17 | COMMON |
FIG. 14D

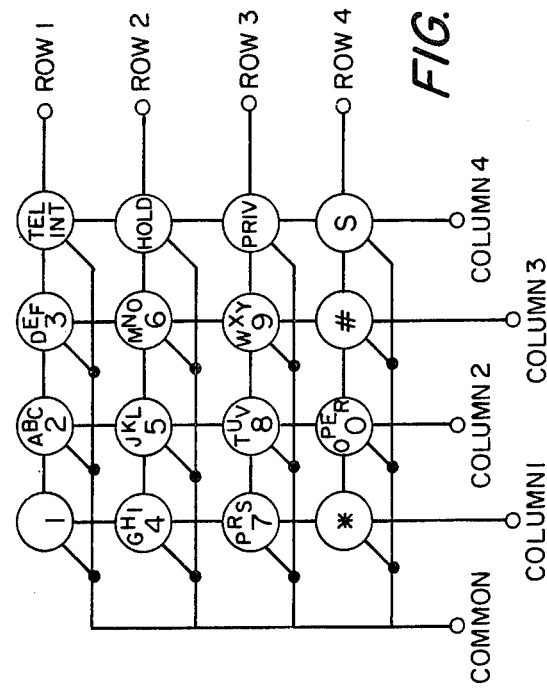
FIG. 15B
| DIGITAL INPUT OUT PUT ARRANGEMENT | |
|---|---|
| OUT PUT PIN NO. | SYMBOL |
| 1 | ROW 2 |
| 2 | ROW 3 |
| 3 | COLUMN 1 |
| 4 | ROW 4 |
| 5 | COLUMN 2 |
| 6 | COLUMN 3 |
| 7 | COLUMN 4 |
| 8 | ROW 1 |
| 9 | COMMON |
FIG. 15C
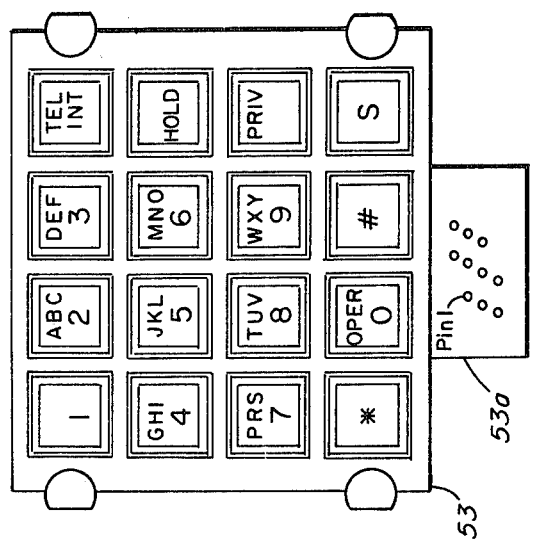
FIG. 15A

POWER LINE CARRIER MULTI TELEPHONE EXTENSION SYSTEM FOR FULL DUPLEX CONFERENCING BETWEEN TELEPHONES

BACKGROUND OF THE INVENTION

The present invention relates to apparatus for remote signaling to a telephone line over the available AC power line. More particularly, the present invention provides a telephone extension system for communicating over the AC power line between telephones of the system and a conventional telephone subscriber telephone line.

U.S. Pat. No. 3,949,172 which issued Apr. 6, 1976, entitled "Telephone Extension System Utilizing Power Line Carrier Signals", which is assigned to the same assignee as the present application, describes a system for doing very much the same thing as the system described in the present application. That patent describes a main (or master) station that couples the subscriber's telephone line to his AC power line and a special extension telephone that plugs into his AC power line at any convenient power receptacle and is used to make and receive telephone calls in a conventional manner. In that patent, the extension telephone includes a hand set with a microphone at one end and an earphone at the other with separate lines from each. The line from the microphone feeds a radio frequency (RF) transmitter and the line to the earphone comes from an RF receiver. A corresponding RF transmitter and RF receiver are provided at the main station. These transmitter-receiver combinations enable full duplex signalling of voice and other signals between the main station and the extension telephone over the AC power line.

The power line, RF carrier extension telephone system in U.S. Pat. No. 3,949,172 provides for a main (or master) station and one extension telephone that plugs into the AC power line at a power line receptacle. That system can accomodate more than one extension telephone and if all transmit at the same extension RF carrier frequency, the main can respond to any one of them. However, the single receiver at the main can respond to only one extension carrier at a time. It is an object of the present invention to provide such a power line carrier telephone extension system including several extension telephones that all can operate at the same time and engage in full duplex communication with each other and with the telephone line on telephone calls placed or received by any of the telephones of the system.

Signalling for other purposes than ordinary telephone usage between a conventional subscriber's telephone line and various kinds of transmit-receive devices over the available AC power line are described in U.S. Pat. No. 4,058,678, entitled "Remote Signaling to a Telephone Line Using Power Line Carrier Signals" (also assigned to the same assignee as the present application). That patent describes a system whereby appliances or other electrical equipment on the AC power line at a premises can be controlled by an incoming telephone call to the premises. The incoming telephone call brings control signals to the premises and these signals are carried by an RF carrier over the power line to the location of an appliance, for example, to turn the appliance on or off. The same patent describes a system for sending an alarm from the premises. For example, a fire detector in the premises plugged into the power line sends an RF alarm signal over the power line to the telephone where it initiates operation of the telephone to call a predetermined number and deliver a prerecorded message. The systems in that patent can each accommodate more than one satellite station (appliance receiver controller or alarm transmitter) in operation at a time in conjunction with a single main station where the coupling between telephone line and power line is made, because the signalling is unidirectional (simplex). It is desireable where two or more of such systems are installed in a premises to integrate them with a single main station. Therefore, it is another object of the present invention to provide a technique of integrating such systems so that the satellite stations of both systems can be operated simultaneously.

Co-pending U.S. patent application Ser. No. 923,674, entitled "Utility Meter Reading via Telephone Lines and Power Lines Utilizing Power Line Carrier Signals" is a continuation-in-part of the application that issued as U.S. Pat. No. 4,058,678. It describes a system that signals in both directions by RF carrier over the power line in a premises, between the premises telephone line and a remote transmit-receive device on the power line that is controlled by the electric meter of the premises. The electric meter is addressed by the Electric Company from a remote telephone by calling the subscriber's phone and feeding electric meter interrogating signals to the subscriber's phone which are, in turn, transmitted over the subscriber's power line to his electric meter transmit-receive device, which responds by transmitting back the meter reading and any other information it is programmed to transmit. In this way, the electric meter is "read" by the Electric Company by a telephone call to the subscriber. Clearly, the remote transmit-receive device specially designed for this electric meter "reading", both receives and transmits information signals, but not necessarily simultaneously. This is called half duplex signalling. It is another object of the present invention to provide a technique of integrating or combining several such meter reading systems with each other and/or with an appliance control and/or an alarm system such as described above so that a single main station at the telephone line serves all the systems.

It is a further object of the present invention in conjunction with the above objects to provide an improved method and means of transmitting voice and data signals over a conventional AC power line at a typical telephone subscriber premises, whereby interference signals from other sources and noise on the power line are avoided.

It is another object to provide a multi-telephone extension system for a telephone subscriber's premises wherein system phones are capable of conferencing between the system phones and other functions such as the I, H, P, and S functions described herein, over a two element intra-premises transmission line.

SUMMARY OF THE INVENTION

The present invention is applicable to, simplex or duplex communication between remote transmit-receive (TX-RX) devices over the available power line in a premises. The communicated signals are processed before transmission and upon reception to eliminate or block at the receiver interfering or mischievous signals from other sources. The remote TX-RX device may be a telephone or it may be a data link modem, or a utility meter specially equipped to respond to interrogation signals from the telephone line by transmitting back meter data signals. In all embodiments of the present invention, the system transmits voice and/or other data over the AC power line by modulated RF carrier.

The preferred embodiment, described in detail herein is the best known use of the invention. It is a telephone system for use with a conventional telephone line at a subscriber's premises, using the available AC power line in the premises for transmitting voice and/or data signals simultaneously in both directions (full duplex) between the several extension telephones of the system and the subscriber's telephone line. In this embodiment, the several extension telephones of the system plug into conventional AC power line receptacles at the premises and so the system is particularly sensitive to RF signals from other sources on the same power line. For example, an AC power main services many premises and the only barrier to RF signals on the power main between the main and the power line in a premises may be the electric meter of the premises. This barrier is usually no greater than barriers within the premises such as across the two phases of the premises power line. Thus, RF launched into the AC power line at a premises is likely to flow to the main and into the power line of a neighboring premises and interfere with a power line communications system in the neighboring premises, and visa-versa.

It is a further object of the present invention to provide such a telephone extension system including several extension telephones, all communicating over the power line that is normally available at a telephone subscriber's premises, and all capable of the conventional telephone usages.

It is another object to provide such a telephone system for a subscribers premises that is private and not subject to power line interference.

It is another object to provide for a conventional telephone line, a subscriber end data link or modem as in the appliance control, alarm and meter reading systems described above which is private and not subject to power line interference.

It is another object to provide a full duplex, multi extension, private communication system for communicating with the conventional telephone line to a premises through the available power line at the premises.

In conjunction with any of the above objects, it is further object to provide such a secured communication system wherein the system signals are coded to distinguish them from interfering signals and the codes are readily set by the user.

Other objects, features and advantages of the present invention will be apparent in view of the following descriptions of specific embodiments which represent the best known uses of the invention and are described herein with reference to the drawings.

DESCRIPTION OF THE DRAWINGS

FIGS. 7 to 11 are tables showing the status of operation of the main (M) and extension ($E_1$ and $E_2$) telephone subsystems for functions and routines including the following: communicating in the telephone line (TL) mode; M, $E_1$, and/or $E_2$ in the intercom (I) mode; placing a TL call on hold (H), imposing privacy (P) between two phones in the I mode or between any phone and the TL; and using the special (S) function for automatic redialing of last number dialed and automatic dialing from a repertory of stored telephone numbers. In particular, these figures show:

FIG. 7
  Answer call from TL by $E_1$ or $E_2$;
  Place call to TL by $E_1$ or $E_2$; and
  Conference $E_1$, $E_2$ and M on TL call.
FIG. 8
  I mode between M and $E_1$ and/or $E_2$;
  I mode between $E_1$ and $E_2$; and
  I mode between $E_1$ and $E_2$ while M on TL
FIG. 9
  H the TL while M and $E_1$ and/or $E_2$ in I
  H the TL while $E_1$ and $E_2$ in I.
FIG. 10
  P between M and TL;
  P between M and $E_1$ and $E_2$ and TL;
  P between $E_1$ and $E_2$ and TL; and
  P between M and TL, while $E_1$ and $E_2$ in I.
FIG. 11
  S used by M last number redial;
  S used by M—dial stored number;
  S used by $E_1$ or $E_2$—last number redial; and
  S used by $E_1$ or $E_2$—dial stored number.

FIG. 14A, B, C, D, and E show electrical details of the key pad in the main telephone; and FIGS. 15A, B and C show electrical details of the key pad in an extension telephone;

DESCRIPTION OF GENERIC EMBODIMENTS OF THE INVENTION

While the present invention has particular use in a power line carrier telephone extension system to reduce the effects of interfering RF signals on the power line whether they are from neighboring power line carrier telephone extension systems or from other sources or mischievous signals intentionally launched into the AC power line to interfere with the user's power line carrier telephone line extension system, it should be understood that the techniques applied in the specific embodiment described herein have useful application in other power line carrier systems. For such general application, a generic embodiment of the present invention is described herein.

Simplex Two Station System

Figure 1:
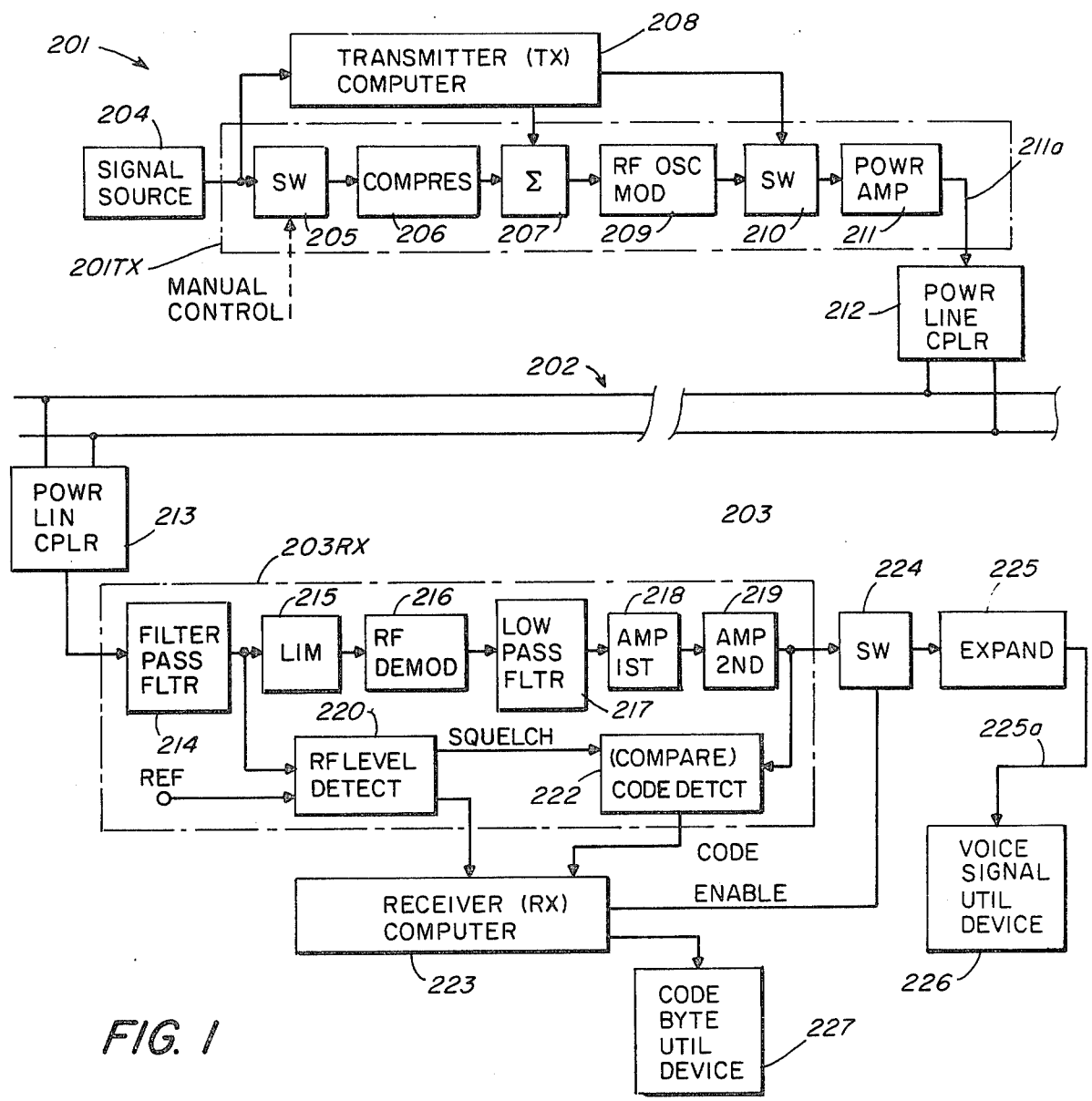
FIG. 1 is an electrical block diagram showing a generic transmit-receive system for transmitting voice and/or other data signals over a conventional AC power line such as at a typical residence and incorporating means for coding the signals and analyzing the received coded signals to enable readily distinguishing the received signals from interfering signals.

Turning first to FIG. 1 there shown a block diagram of a power line transmit-receive (TX-RX) system for the simplest case, simplex signalling from one station in a premises to another station on the AC power line (or on any two element, intra-premises transmission line). As shown in FIG. 1, the first station, the transmitter station 201 generates analog signals and digital CODE signals including, for example, an address byte, a code byte and a checksum byte, combines this CODE with the analog signals and transmits the combination as DATA by RF carrier over the AC power line 202 in the premises. The other station, the receiver station 203, first detects the RF carrier and then demodulates the received signal, and detects and examines the CODE and sends the code byte the analog part of the signal on to a utilization device depending on whether or not the following conditions are met:

(a) the RF power level of the detected carrier is at a predetermined minimum value;
(b) in the CODE, the address and code bytes match the checksum byte:
(c) the address byte satisfies the stored address at the receiver; and
(d) the code byte matches one of the stored codes at the receiver.

Clearly, the transmitter station 201 determines the address code and checksum bytes that accompany the data signal and the power level of the transmitted RF carrier. Hence, the transmitter station determines whether or not the receiver station 203 will recognize the transmitted signal and feed it to the utilization device. Presuming that the address and code bytes combined with the signal at the transmitter station match those stored at the receiver station, then the determination as to whether or not the signal will be recognized at the receiver station depends upon the power level of the carrier that is received at the receiver. Presuming further, that the RF carrier power level that is transmitted by the transmitter and the RF power carrier level that will be recognized at the receiver are both preset, then, the determining factor of whether or not the received signal will be recognized and fed to the signal utilization device depends upon the attenuation of RF that occurs in the AC power line 202 and that determining factor is useful in distinguishing between RF signals of the same (or close) frequency where one is a system signal from within the users premises and the other is from a neighboring premises.

This technique of signalling and signal recognition is particularly useful in power line carrier systems within a typical residential premises in a neighborhood where several such premises connect to the same Electric Company power main, each through an electric meter that is identified with the premises. There are usually eight to twenty such premises on a power main between the power main transformers. This is significant, because the usual RF power line carrier signals are substantially totally attenuated at a power line main transformer, but they are much less attenuated by the usual subscriber electric power meter. Hence, outside of the user's own premises, the most likely source of interfering or mischievous RF power line signals are the other eight to twenty premises on the same side of the power main transformer and between any of those other premises and the user's premises there are most likely to be two power meters, the user's meter and the other's meter. The usual attenuation of RF carrier on the power line at the frequencies that are used (50 to 500 KHz), through a typical electric meter is about 20 db, and so attenuation through the power meter at the user's premises and a neighbors power meter is about 40 db, whereas the usual attenuation extreme within a subscriber's premises of carrier in this range from one station (on one phase of the subscriber's power line) to another station (on the other phase) rarely exceeds 40 db. Under these circumstances, an effective screen can be provided at the receiver by detecting the received RF carrier power level and using that level as one determination of whether or not the received signal will be recognized.

It should be noted, that screening the received RF carrier (in the receiver band) for power level, (thereby screening out signals in the band from other premises) can, by itself, be effective to eliminate a great deal of such interference. However, this presumes that all of the power line carrier systems in the other premises that transmit in the same band limit the amount of RF power that they launch into the power line. Clearly, that amount of power could be determined by a regulatory agency to satisfy the usages of such equipments in just about all premises and, presuming there are two electric meters between one premises and another and the attenuation through each meter is at least a predetermined minimum, then the receiver thresholds in all such systems could be preset in reliance on regulations to limit the RF power levels from neighboring premises. Inasmuch as there are at the present time no such regulations or controls and inasmuch as there is a likelihood of intentional mischief being conducted at one premises to interfere with the use of a power line carrier system at a neighboring premises, the screening at the receiver by detected carrier level only is not sufficient, and so additional screening provided by coded signals is necessary.

Figure 2:
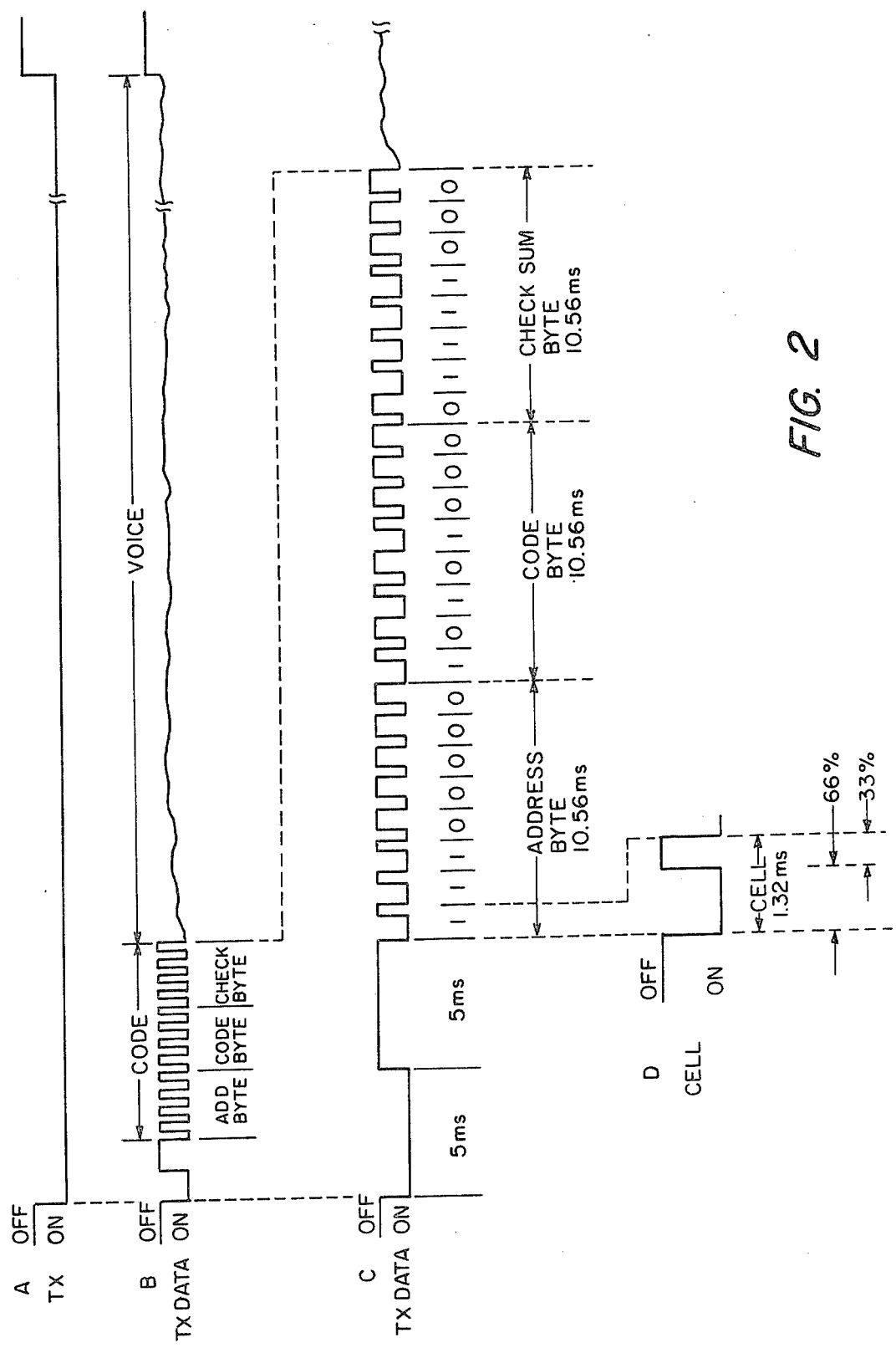
FIG. 2 shows waveforms A to F as illustrations of the technique of coding.

FIG. 2 shows a set of waveforms A to D that illustrate one technique of coding transmitted data that is suitable for the purposes described above and use in the system shown in FIG. 1. In FIG. 2, waveform A shows a transmission interval, called the TX interval that is ordered at the transmitter station 201. Waveform B shows a complete signal interval called the TXDATA interval, within the TX interval. TXDATA includes analog voice signals called VOICE following the code message called CODE. TXDATA begins for a few milliseconds with the special CODE signals. The TX and TXDATA normal or "resting" state (off) is high when the transmitter is turned off. The transmitter 201TX is ordered to send a TXDATA message when the CODE message from the transmitter (TX) computer 208 goes low and remains there for five milliseconds (5 ms). This indicates to the transmitter that a voice message, VOICE, is coming from the source 204. After this 5 ms interval, the transmitter returns high for no less than 5 ms and the next falling edge is the start of the first bit of the CODE, called a CODE CELL.

Consider, for example, where the RF carrier frequency is 120 KHz and, the CELL is 156 cycles long. Waveform C shows B expanded in time and D shows a CELL of C expanded in time. The CODE CELL width is then 1.3 ms. Then, let the pulse width of each cell be modulation 33%/66% as shown in waveform D. This gives a minimum pulse of 0.43 ms. Then, let the CODE protocol be: address byte, code byte and checksum byte, each eight CELLS long. Furthermore, in this protocol, unused CELLS of the address will be zero and the checksum seed is 00 and so all three bytes add to zero ignoring the carry. This gives a CODE message length of $(24 \times 1.3) + 5$ milliseconds = 37 milliseconds at the beginning of the VOICE message.

At the receiver 203RX, after band pass filtering, RF carrier threshold detection, demodulating and low pass filtering, the received CODE is ready for examination and is in the same form as sent. This means that the polarity of the impulses of the CODE is the same as sent. The receiver at 203 continually monitors reception of RF carrier and in the absence of carrier, produces a high signal similar to the high shown by the waveform B. The receiver program responds to a low from its monitor, indicating that RF carrier in the system band pass at a predetermined minimum power level is present, and when this low occurs, it immediately switches to a receiving routine. The receiving routine recognizes all front edges of the demodulated RF carrier, beginning at the start of the CODE message. First, it integrates from 33% to 66% of the width of each received CODE CELL and decides if the CELL is a binary one or zero. If the integrated level for a CELL is high, then the CELL is a zero, and if it is low, then the CELL is a one.

The CELL width, 1.3 ms, and integration over 0.43 ms of this width is suitable for eliminating a certain kind of RF noise that can come from the user's premises, as well as from outside the user's premises, and is produced typically by light dimmers that have silicon control rectifiers (SCR) as the controllable variable element therein for controlling power to a light, because such SCR's typically produce impulses a few microseconds duration at 8.33 ms intervals. The receiver has high immunity to such noise from SCR's, because the CELL integration action is much slower than the SCR impulse duration, integration is over a much longer interval (0.43 ms) than the impulse interval and the intervals between impulses is much longer than a CELL width. The received voice portion of the DATA does not interfere with the CODE, because of the lower modulation level of voice.

Turning again to FIG. 1, the transmitter station 201 includes a source of signal 204 which may be analog voice or other data and a signal compressor 206 that enhances transmission by compressing the frequency band of the source signals into a more narrow band, which has obvious advantages in a frequency modulated carrier transmission system. To the output of the compressor, in summing circuit 207, is added the CODE and so VOICE and CODE are combined as shown in waveform 2B to form the TXDATA signal. As mentioned above, the CODE may be, for example, the 3 byte code shown in waveform 2C and include the address byte, the code byte, and the checksum byte, each eight bits long, occupying 37 ms of the total TXDATA message. This message is fed to the transmitter RF oscillator and modulator 209 and the modulated carrier is fed to the transmitter power amplifier 211 via switch 210 which is controlled by the transmitter (TX) computer 208. By this switch the TX computer turns the transmitter 201TX, on and off, depending on a predetermined criteria met by the signal from the source.

The output from the transmitter, in line 211a from power amplifier 211 is fed to the premises AC power line 202, via the transmitter power line coupler 212. This coupler may perform as a filter-directional coupler and include an absorbing load to protect the transmitter from RF from the power line.

At the receiver, station 203, RF from the transmitter is coupled from the power line 202 by coupler 213 and fed to the receiver 203RX that includes band pass input filter 214, limiter 215 and demodulator 216. The output of the demodulator, called RXDATA, is fed through low pass output filter 217 to two stages of audio amplifiers, 218 and 219 and from the second stage to expander 225, via switch 224, producing the receiver output in line 225a. From the output of the second stage audio amplifier, the received RXDATA is compared with a reference signal level by code detect circuit 222 that adjusts the pulse level of the RXCODE portion of RXDATA so that it is suitable to feed to the receiver (RX) computer 223. Meanwhile the received RF in the output of the band pass input filter 214 is processed by a carrier level detection circuit 220 and switching amplifier 221 that produces a carrier status on/off signal suitable for the RX computer 223. A similar signal from the carrier level detection circuit 220, the squelch signal, is fed to code detect circuit 222 to squelch its output in case the RF carrier status level is off. Thus, the receiver up to this point screens the received carrier power level and squelches any detected CODE in case the RF level criteria is not met.

The RX computer 223 is programmed to perform the examination of the received message RXCODE that includes the address byte, code byte and the checksum byte. The computer integrates from 33% to 66% of each CODE CELL and decides if the CELL is a zero or a one. It then adds the address, code and checksum bytes (without carry) and if the sum is zero, it produces an enable; or if not zero, it produces a disable signal that turns switch 224 off. In addition to this, the receiver computer examines the contents of the address byte, the contents of the code byte and it compares them with preset numbers in the computer. If they both compare, then the disabled-enable signal to switch 224 is not changed. However, if they do not compare and the signal to the amplifier is enable, then that signal is switched to disable. In this way, the computer checks the received address and code to be sure that it is received as sent and then correlates them against stored address and code numbers and if the check and the correlations are all satisfied, the RXDATA is fed through switch 224 to expander circuit 225 and then to voice signal utilization device 226. At the same time (or instead) the correlated code byte may cause the computer to send an initiating signal to the code byte utilization device 227.

All signals in the output of the second stage audio amplifier 219 are fed to expander circuit 225, producing the receiver output that is fed to the signal utilization device 226. The function of the expander is to return the full frequecy band to the received data (VOICE) signals and so compensate for the compression that occured at the transmitter. Between the switch 224 and expander 225 may be included a summing circuit for adding to the VOICE signals any other signals or tones that are appropriate, in view of the overall uses and functions of the system. Such tones and signals may be stored or generated in the RX computer and are selected depending on the code byte of the received signal. Adding signals in this way is a function of the RX computer in the specific embodiment of the present invention, a power line carrier telephone extension system, that is described in detail herein.

Full Duplex Multi Station System

Figure 3:
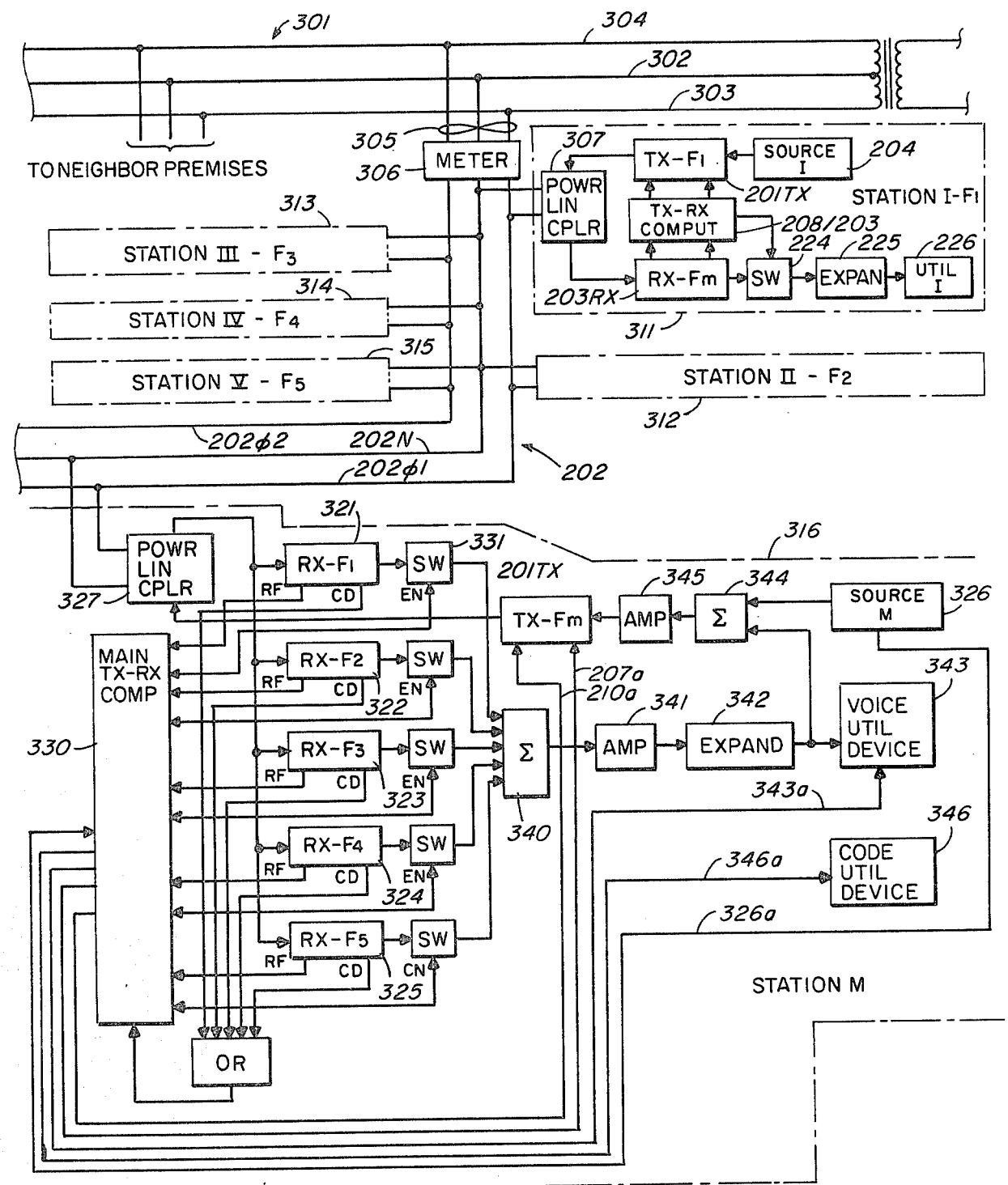
FIG. 3 is an electrical block diagram showing a generic, multi-station, full duplex system for transmitting voice and/or other data signals over a conventional AC power line such as at a typical residence and incorporating the features shown and described with reference to FIGS. 1 and 2.

The generic signalling technique described with reference to FIGS. 1 and 2, as already mentioned, has particular application and use in a premises such as a residence, in a system within the residence that signals over the available AC power line and so the system requires screening against interfering signals that may originate from neighboring premises on the same power line main. The techniques described herein have application to a multi-station system in the premises that is capable of simultaneous full duplex signalling between all of the stations of the system and so each station includes a transmitter and a receiver and a computer for encoding, decoding and controlling the transmitter and receiver in accordance with the techniques shown and described with reference to FIGS. 1 and 2. Such a full duplex, multi station (more than two) system is shown in FIG. 3. The transmitters and receivers in FIG. 3 may be constructed and operate the same as the transmitter 201TX and the receiver 203RX of FIG. 1 and, where that is the case, they are referred to by those reference numbers without further detail. The station computers in FIG. 3 are all referred to as TX-RX computers which means that they perform all of the functions of the TX computer 208 and the RX computer 223 in FIG. 1 with respect to the associated transmitter and receiver. This is the case for all of the TX-RX computers except the main TX-RX computer for the main station which will be described further hereinbelow.

Turning to FIG. 3 there is shown a typical power main 301 that includes three wires, the neutral 302 and the power wires 303 and 304 at phase one (01) and phase two (02). The phases are, for example, 180° apart and the RMS voltage from the neutral to either of the phases is 120 volts at 60 Hz and so the RMS from phase one to phase two is 240 volts. From the power main 301, a three wire line 305 feeds the premises through the premises electrical power meter 306 to the premises AC power line, denoted generally 202 (as also in FIG. 1). For purposes of illustration, the power line 202 is represented by three wires, the neutral 202N, the phase one wire 20201 and the phase two wire, 20202. Within the premises are six satellite stations, herein called stations I, II, III, IV, V and the main, called M, that all couple to one or the other phases of the premises AC power line 202. The stations I to V are denoted 311 to 315 and the M station is denoted 316.

The stations I to V may all be identical except for the carrier frequency that each transmits, referred to herein as RF carrier frequencies or channels $F_1$ to $F_5$ respectively. Hence, only station I, denoted 311, will be described herein in detail. Station I includes a transmitter like transmitter 201TX and a receiver like 203RX of FIG. 1 and so the transmitter and receiver at the station bear the same reference number as in FIG. 1. The transmitter and receiver are controlled and supported by a computer that does all the functions and controls that the TX computer 208 and the RX computer 223 perform in FIG. 1 and so the computer at the station is referred to as a TX-RX computer and is denoted 208/223. The source of signal and the utilization device at the station may be the same as source 204 and utilization device 226 in FIG. 1 and so they bear the same reference numbers. The coupler 307 from station I to the AC power line 202 couples RF from the transmitter to the power line, it couples RF from the power line to the receiver and it may draw power from the line for a power supply (not shown) for the transmitter, receiver and computer at the station. The construction of this coupler, 307, is described herein with reference to the specific embodiment, a power line telephone extension system, particularly with reference to FIG. 13.

At each of the other stations I to V are substantially identical TX-RX combinations as at station I, except that they each transmits at a different carrier frequency. For example, station I transmits the carrier frequency F1, station II transmits the carrier frequency F2, and so forth. All of these stations receive the same carrier frequency, Fm, from the main station at location 316. Hence, the only difference between stations I to V may be that they transmit on different channels. Otherwise, they all send signals from their station source and they all use signals at their station utilization device and the transmission and reception is full duplex between all stations. Clearly, at any of the stations, any of these features may be omitted and the transmission and/or reception at any station may be simplex or a station may transmit only or receive only, depending on the purposes of the total system.

At the main station 316 the transmitter 201T that transmits on carrier frequency Fm, may be substantially the same as the transmitters at the stations I to V and the same as transmitter 201T in FIG. 1, except that there is no switch like switch 205 controlling signals to the compressor 206, because the function of the main transmitter is not just to transmit signals generated at the main station. The main transmitter's function is also to relay to the receivers at all (or some) of the other stations of the system the received data from any of the transmitters of the other stations of the system. Hence, the transmissions from the station I to V are all received at the main station by the individual channel receivers 321 to 325, respectively, and all data received is combined and immediately transmitted by the main station transmitter 201TX to all of the stations. Therefore, the input to transmitter 201TX is the combined outputs of the receivers 321 to 325, plus any signals generated at the main station from the main source 326. The output of the main transmitter 201TX is coupled to the power line 202 by the main power line coupler 327. The construction of this coupler is described herein with reference to the specific embodiment, a power line telephone extension system and shown in FIG. 12.

Each of the channel receivers at the main station 316 is constructed and operates substantially as receiver 203RX already described with reference to FIG. 1. Hence, the receivers 321 to 325 each include a band pass input filter 214, a limiter 215, a demodulator 216, a low pass input filter 217, a first stage audio amplifier 218, a second stage audio amplifier 219, a CODE detect circuit 222 and a carrier level detector circuit 220 that squelches the CODE detect circuit output to the RX computer when received RF carrier power level falls below a pre-determined level and feeds an RF carrier status signal to the RX computer. The CODE and RF status control lines from these receivers to the main TX-RX computer 330 are the same as the control lines from receiver 203RX, to RX computer 223 and these lines carry control signals that function just as already described with reference to FIG. 1.

At any of the receivers 321 to 325, when the received RF power level compares satisfactorily with a reference level, the detected RXCODE is fed to the main TX-RX computer 330, via OR circuit 331. In the main computer the RXCODE is correlated with stored signals and if it correlates with the stored signals, the computer immediately enables the corresponding receiver by an enabling signal to the receiver output switch 331. This switch feeds the receiver output to summing circuit 340 that sums the switch outputs of all of the receivers 321 to 325, as those outputs are controlled by the computer. The output of summing circuit 340 is amplified by audio amplifier 341 and fed to expander circuit 342 that has the same function as expander circuit 225 in FIG. 1.

The main TX-RX computer 330 is responsive to all of the same inputs and performs all of the same functions and controls as the TX and RX computers 208 and 223 in FIG. 1. It performs these functions for the main transmitter 201TX and for all of the channel receivers at the main station; and, in addition, it may store predetermined data signals that may be tones, numbers, VOICE or CODE and are fed into the system for transmission to the stations I to V at summing circuit 207 in the main transmitter 201TX, or they may be fed to the main station voice utilization device 343 via line 343a or the main station CODE utilization device 346, via line 346a, depending upon the code signals received from the other five stations and/or depending upon a signal initiated at the main station from the main source 326, fed to the computer via line 326a. Also at the same time, (or instead) correlated code byte may cause the computer to send an initiating signal to the code byte utilization device 346.

At the main station, the received channel voice signals from the expander circuit 342 are fed to the main transmitter 201TX via summing circuit 344 and the transmitter input amplifier 345. The purpose of summing circuit 344 is to combine such voice signals originating at the main station from the main source 326 with the received voice signals for transmission to the other five stations.

The power line carrier systems in both FIGS. 1 and 3 are presented herein as basic systems, because they teach techniques of signalling that are used in these specific embodiments. FIG. 1 shows and describes a simplex unidirectional signalling system including just two stations, one transmits only and the other receives only. FIG. 3, on the other hand, teaches a system including a multitude of stations all of which both transmit and receive full duplex and all stations can conference together and draw upon signals stored in the main station computer for transmission to all or selected of the other stations depending on the address in the CODE that accompanies the signal. Common techniques incorporated in both of these examples include the techniques for screening the received signals to eliminate interfering signals whether they originate from within the premises where the system is used or from outside of the premises from, for example, a neighbors premises that connects to the same power main 301, on the same side of the power main transformer 301a as the premises in question. That screening is described in detail with reference to the operation of the system in FIG. 1 and applies also in FIG. 3.

Where the power main 301 provides two phases as shown in FIG. 3, a premises that takes power from the main is likely to take power from both of the phases and so some of the electrical outlets (receptacles) in the premises will access one phase of the power line while others will access the other phase and so within that premises, some of the stations are likely to plug into one phase while other stations plug into the other phase. Clearly, the stations plugged into the same phase have a relatively low impedance transmission path between them, (substantially less than 40 db), whereas stations plugged into different phases have a relatively higher impedance transmission path between them (about 40 db). An examination of the latter case reveals that RF is coupled from phase to phase at the premises meter 306 and also at the power main transformer 301a. The greater portion of this coupling is at the premises meter. For example, the coupling factor for RF frequencies ranging between 50 and 500 KHz across the meter exceeds by several orders of magnitude the coupling factor across the power main transformer. Hence, the RF power level at any of the outlets on one phase in a premises that results from the power launched into the other phase in the premises is likely to be several db greater than the level of said RF power that reaches the electrical outlets in a neighboring premises (80 db down). Thus, the technique described herein for screening the received RF in the receiver band at any of the stations in the system strictly on the basis of RF power level, is effective to screen out signals in the band originating in a neighboring premises. The additional screening by code, and address and checksum signals affords additional assurance that interfering signals in the receiver band from a neighboring premises will be rejected.

DESCRIPTION OF SPECIFIC EMBODIMENTS OF THE INVENTION

Figure 4:
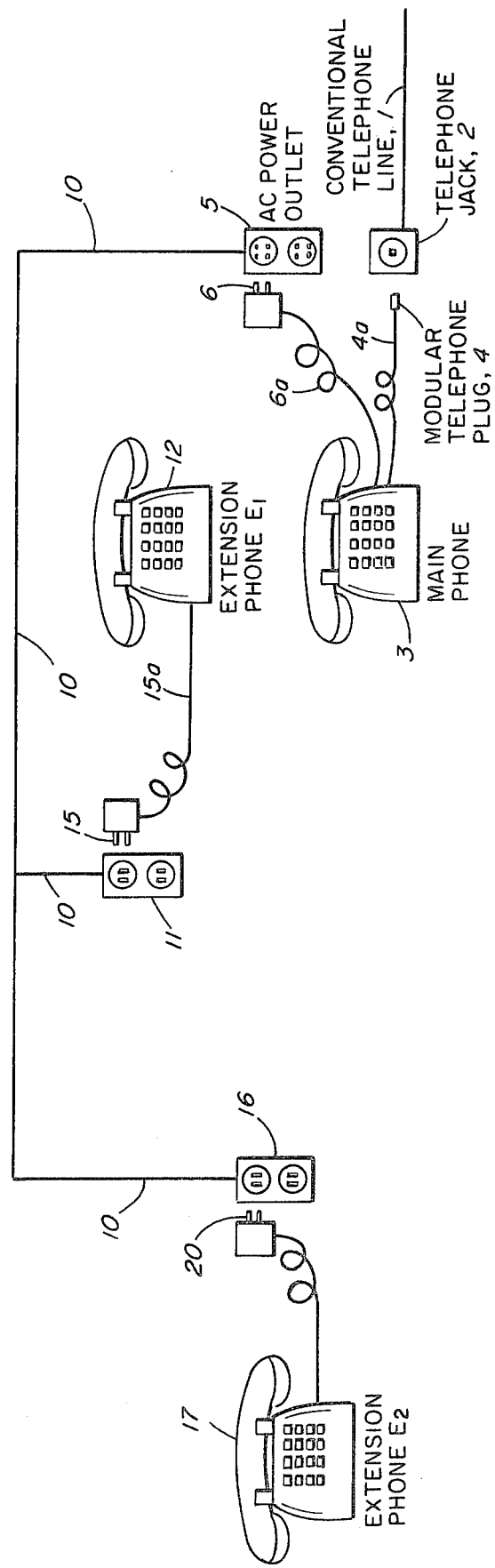
FIG. 4 is a pictorial representation of a power line carrier telephone extension system incorporating features of the present invention and including a main telephone and one or more extension telephones that communicate with each other and the telephone line over the AC power line and have Intercom (I), Hold (H), Privacy (P) and Special (S) features of operation in addition to all conventional telephone operations.

The best known use of the present invention is the embodiment illustrated pictorially in FIG. 4. It is a power line carrier telephone extension system that includes three telephones on one telephone line sometimes referred to as a 1×3 telephone system. This system provides conventional telephones services which may be either rotary dial or Touch Tone type, at several locations along the AC power line available at a telephone subscriber's premises. Other uses include sending and/or receiving voice or data or alarm or control signals by RF carrier over the conventional AC power line for any purpose, including all purposes mentioned in this application.

As shown in FIG. 4, the subscriber's premises has a telephone line which usually consists of four wires called the tip line, the ring line, earth ground and a fourth line for special party line ringing circuits. The ring line is usually red, the tip line is green, the earth ground is black and the fourth line is yellow. As a rule, three of these lines, the tip, ring and ground, connect to "on line" conventional telephones at the premises and also connect to telephone line wall jacks.

In a conventional telephone system at a subscribers premises, extension telephones connect to the telephone line at the wall jack by merely plugging them in and any such extension phone can engage an incoming telephone call and can place a telephone call to the telephone line. The system described herein provides the same service and, in addition, provides features called: Intercom (I), Hold (H), Privacy (P) and Special (S), that are described more fully hereinbelow. These are all in addition to the feature that the extension telephones of the system can be used at any of the available AC power receptacles in the premises and so their use is not restricted to where a telephone line wall jack is provided.

In FIG. 4 access to the subscriber's telephone line 1 is at the telephone wall jack 2. The main (M) telephone 3 of the system plugs into the jack 2 by a conventional (modular) telephone plug 4 at the end of line 4a and also plugs into a nearby AC power line outlet 5 by an AC power adapter plug 6 at the end of power cord 6a. By these connections, the subscriber's telephone line 1 is linked to his AC power line, which is denoted generally 10. At any of the other AC power outlets (receptacles) on his AC power line 10, the system extension telephones can be used. For example, at 11, extension ($E_1$) telephone 12 plugs into the power line 10 by its AC power adaptor plug 15, via its power cord 15a. Similarly, at another AC power outlet 16, the system extension ($E_2$) telephone 17 plugs into the power line by AC power adaptor plug 20, via its power cord 20a. The system extension telephones 12 and 17 may be the same in construction and operation except for the specific RF carrier frequency $F_1$ or $F_2$ and address signals that are set in each in conjunction with similar settings in the main telephone 3.

In operation, an incoming telephone call ring signal in the telephone line 1 is processed through the M telephone 3, which transmits a ring signal by the main RF carrier frequency, Fm, (channel m) over the power line 10 and it is received by the system $E_1$ and $E_2$ phones, 12 and 17, causing them to ring. This incoming call can be answered by any of the system telephones, or all can simultaneously engage the incoming call and communicate with each other. Thus, the incoming caller and all the system telephones can conference together. In addition, the incoming call is not terminated at the subscriber's location until all of the system telephones are on hook (cradled). Furthermore, any of the system telephone can place a call to the telephone line, just as any conventional phone places a call, by the phone going off hook and signalling the call number by using the phone's key pad (buttons); and before, during or after this signaling, the other phones of the system can go off hook and join in the call. Thus, the conventional operation of the system illustrated in FIG. 4 is much the same as conventional extension telephone operation, with the added feature and advantage that the extension telephones of the system can be located in the premises at any convenient AC power outlet.

Main Telephone Circuits

Figure 5:
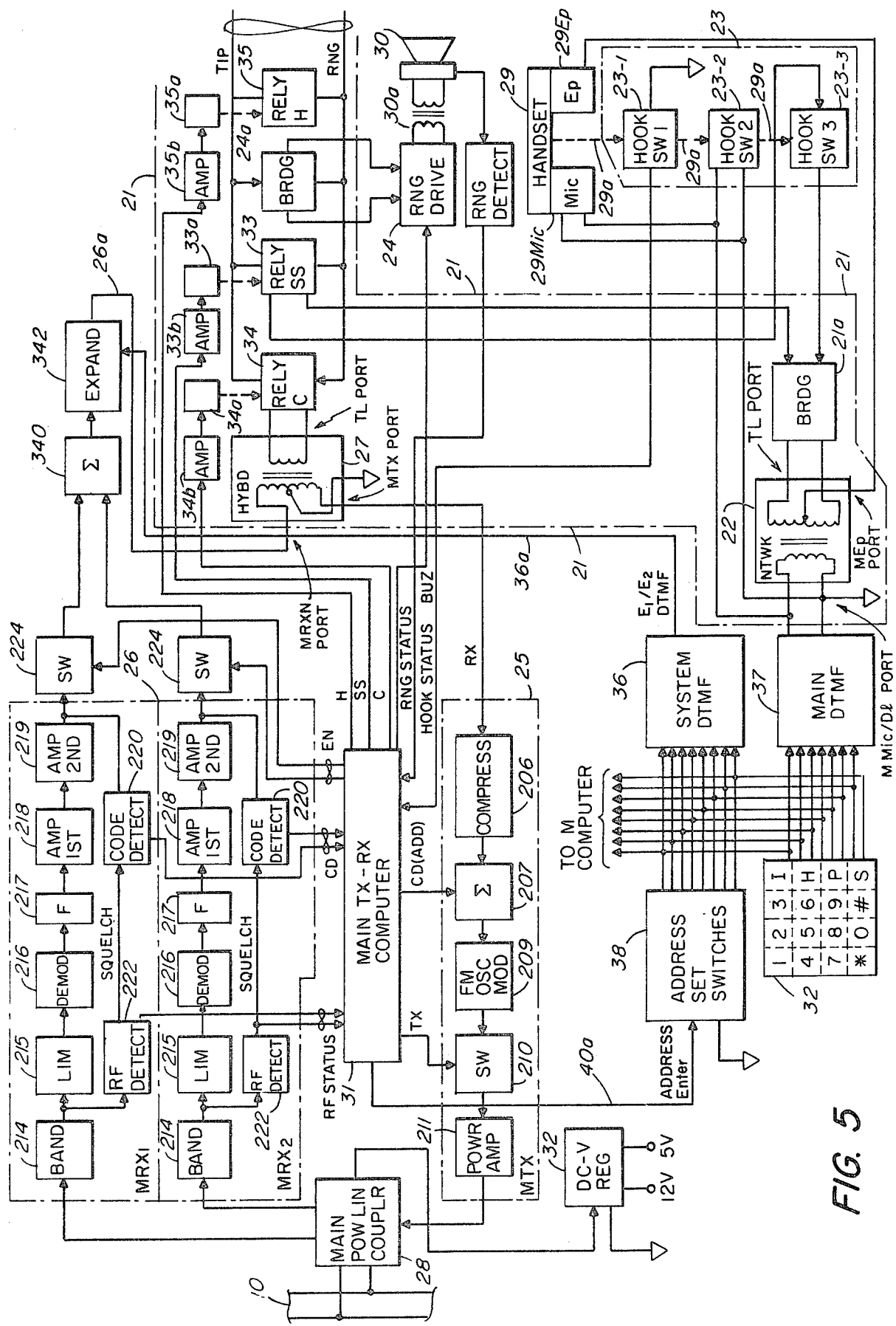
FIG. 5 is an electrical block diagram showing the principle electrical subsystems of the main telephone of the system.

Turning next to FIG. 5 there is shown an overall electrical block diagram of the system main telephone circuits. Some of the block sub-systems shown in FIG. 5 are shown also in greater detail in other figures that are denoted in the blocks. Some parts of these sub-systems are shown in more than one of the detail figures. This is done intentionally as an aid in understanding the details. Wherever a given part appears in any figure, it bears the same reference number.

All signals that are transmitted between the main (M) and extension ($E_1$ and $E_1$) phones of the system are transmitted by RF carrier (Fm, $F_1$ or $F_2$) and are called system signals. The transmission of system signals is denoted TXDATA and the reception RXDATA.

The main telephone 3 circuits include a telephone line interface subsystem 21 that connects directly to the subscriber's telephone line 1, via plug 4 and jack 2. The interface 21 includes a telephone line network 22 that is a multi-port directional coupler similar to the network used in conventional telephones. The interface provides an appropriate impedance across the telephone line and directs incoming and outgoing voice between the system and the telephone line. It also switches signals between the system main and the $E_1$ and $E_2$ phones subject to the position of the main phone hook switch 23. More particularly, interface 21 feeds the main telephone ringer drive circuit 24 directly from the telephone line and feeds the main transmitter subsystem 25 from the telephone line and the main receivers (MRX) 26 via the multi-port system network 27 (also a directional coupler) and referred to herein as the system hybrid. The MTX 25, in turn, feeds ring, voice and data (voice) and CODE system signals through the main power line coupler circuit 28 to the AC power line 10.

The ports of network 22 are: input port MMic/D1; output port MEp; and input-output port TL that connects to the telephone line via diode ridge 22a and the SS relay switch 33. The ports of hybrid 27 are: input port MRXN (line 26a); output port MTX to an input of transmitter 25; and input-output port TL that connects to the telephone line via C relay switch 34.

As mentioned above, ringer circuit 24 responds, to ring signals on the telephone line and, preferably, it gets all of its power for these signals from the telephone line. In response to the ring signals, it drives the main telephone ennunciator (ring speaker) 30 via speaker transformer 30a.

The main speaker 30 is also energized by buzz signals from the main TX-RX computer 31 when the computer decodes an intercom buzz signal from one of the extension phones in the system. This buzz signal and power supply voltage from voltage regulator 32 energize the speaker through the drive circuit 24 to produce an audible buzz.

The main power line coupler circuit 28 is a reactive circuit and, in fact, a transformer. However, it should be understood that this coupling between the AC power line and the telephone line can be capacitive as well as inductive.

The MRX subsystem 26 receives RF carrier signals from the power line coupler 28 that originate from the system $E_1$ and $E_2$ telephones and the received signals that pass tests for RF power level and code are fed by line 26a through the hybrid directional coupler 27, of interface 21, to the telephone line 1. Among the system signals that may be received, originating from one of the system extension telephones, are command or status signals. They are strictly CODE signals including the code byte, like the extension hook signal and key pad signals. These are fed from receivers 26 to the main TX-RX computer subsystem 31 and initiate special actions at the main telephone as are described more fully hereinbelow.

The main TX-RX computer 31 processes all system signals between the main and extension phones. More particularly, it processes all initiating and terminating signals from the telephone line including ring signals, processes all signals from the system extension telephones, processes the main telephone hook switch signal derived from hook switch 23, processes all signals from the main key pad 32, controls the subset (SS) relay switch 33, the carrier (C) relay switch 34 and the hold (H) relay switch 35, (all in the telephone line interface 21), turns the main transmitter 25 on and off, adds CODE to the analog VOICE transmitted by the main transmitter and controls the system dual tone multi-frequency (DTMF) generator 36, depending on coded key pad signals received at the main from an extension.

In this processing, the main computer performs logic functions on all CODE signals received from the extensions as described above with reference to FIGS. 2A to 2D and it generates and adds CODE to all signals transmitted by the main transmitter and, unless the CODE that accompanies a received signal satisfies predetermined criteria programmed in the main computer, the received signal is not recognized, even if it is at the RF carrier frequency $F_1$ or $F_2$ and the received RF power level is sufficient.

EXTENSION TELEPHONE CIRCUITS

Figure 6:
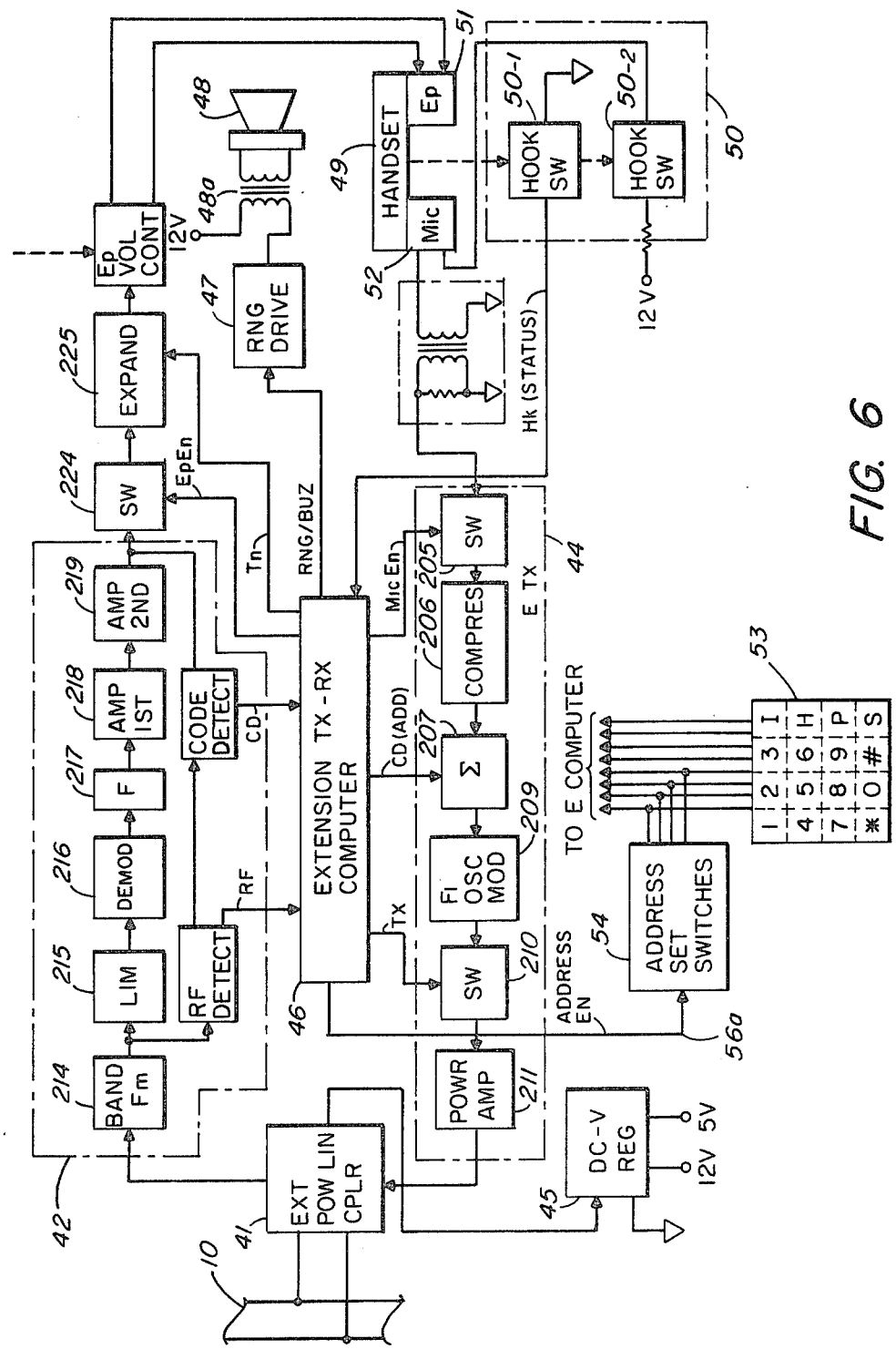
FIG. 6 is an electrical block diagram showing the principle electrical subsystems of one of the extension telephones of the system.

An extension telephone ($E_1$ or $E_2$) circuits are shown in FIG. 6. These circuits include the extension power line coupler circuit 41 that may be constructed and function the same as the main power line coupler 28. All signals transmitted by main transmitter 25 (called system signals) and fed through coupler 28 over the AC power line 10 are fed via the extension power line coupler 41 to the extension receiver 42. The first part of a signal transmitted by the main transmitter is the CODE that includes an address byte and a code byte. For example, beginning with the extension telephone on-hook, the first signal may be a telephone line ring signal. That ring signal is simply an address byte, code byte and check-sum byte (the CODE) that are detected at the extension receiver 42 by CODE detector circuit 222 that feeds detected CODE to the extension TX-RX computer 46. If this CODE passes the logic tests at the computer, the computer turns on the ringer circuit 47 that drives the ennunciator (ring speaker) 48 via transformer 48a and so the extension phone "rings".

Thus, an initial received signal at the extension receiver 42, the ring signal, received while all system phones are on-hook, is processed by the extension computer which turns on the extension ringer circuit 47 that drives the speaker 48 producing an audible sound. When the extension phone is answered by lifting its handset 49, the extension hook switch 50 produces an off-hook signal that is fed to computer 46. In response to this, the computer turns on the extension transmitter 44 which transmits the extension off-hook CODE signal (containing the off-hook code byte) generated by computer 46 on the extension RF carrier frequency, through coupler 41 to the power line 10 to the main phone receiver. Thereafter, at the main phone, the extension off-hook CODE is detected and processed and the telephone line loop for the extension is closed by actuating both the subset (SS) and carrier (C) relays 33 and 34 (as shown in FIG. 5) and the main transmitter is turned on again, beginning another main telephone line TXDATA phase which consists of CODE followed by signals from the telephone line. The telephone line signals are conducted via relays 33 and 34 and hybrid 27 to the main transmitter 25. All of these signals are received at the extension receiver 42, processed in 46 and the telephone line signals fed to the extension earphone 51.

Meanwhile, audio signals from the extension phone microphone 52 are fed to the extension transmitter where CODE from the extension computer 46 is added and begins another extension microphone TXDATA phase.

All of the above described may occur as described while the main phone is on-hook, or after the main and the other extension phone go off-hook after the extension of discussion. Thus, all audio signals from the microphones of all phones of the system that are off-hook are fed to the telephone line and all telephone line signals are transmitted to the earphone of all phones of the system that are off hook.

The main and the extension circuits shown in FIGS. 5 and 6 are for the most part symmetrical with respect to each other. For example; note the following:

| Main Circuits | Extension Circuits |
|---|---|
| transmitter 25 | transmitter 44 |
| receiver 26 | receiver 42 |
| ringer drive 24, speaker 30 | ringer drive 47, speaker 48 |
| key pad 32 | key pad 53 |
| power line coupler 28 | power line coupler 41 |

As will be seen from detailed descriptions of these circuits, some of these main subsystems circuits are interchangeable with their equivalent extension subsystem circuits. For example: the power line couplers 28 and 41 can be identical; the transmitters can be the same except they generate different carrier frequencies, and the receivers can be the same except their input filters are tuned to different frequency bands.

CONVENTIONAL TELEPHONE FUNCTIONS

The main and extension telephones in the systems perform all the functions of conventional single line telephones in current use by subscribers with one or more extension telephones. These are:
(1) placing an outside call by any of the phones;
(2) receiving an outside call by any of the telephones;
(3) conferencing between any and all of the telephones on an outside call; and
(4) an outside call is held so long as any one of the telephone receivers is off hook (and in the telephone line (TL).

In addition, so long as an outside call is held because one of the system extension phones remains off hook, either or both of the extension phones can be unplugged from the power line and moved and then plugged in again without terminating the outside call. The outside call can be terminated only by one of the system phones, while plugged in, going on hook while the other phones of the system are either already on hook or not plugged in. This feature is intrinsic to the system whether the system includes the Intercom (I), Hold (H), Privacy (P) or Special (S) functions.

ADDITIONAL TELEPHONE FUNCTIONS

The main and extension telephone computers 31 and 46, shown in the electrical block diagrams of FIGS. 5 and 6 perform all of the processing, logic, tests and controls already described with reference to those figures in response to signals input to the computers to accomplish the conventional functions of the telephones described above. Additional telephone functions of Hold (H), Intercom (I), Privacy (P) and Special (S), described hereinbelow, can be added to this performance. In the performance of these additional functions, the computers store many values and parameters that are preset therein and they generate CODE, control and tone signals as will be more fully described below. In particular, the computers perform processing, logic, and tests and store all of the signals as described above with reference to both of the general systems illustrated by FIGS. 1 to 3 and the specific embodiment shown by FIGS. 4 to 6, as they are described so far. Hence, in the following detailed description of the operations of the specific embodiment incorporating the additional functions of H, I, P and S, reference is sometimes made to these general systems and all that is described and shown therein is incorporated in the specific embodiment.

The specific embodiment includes the additional functions (features) H, I, P and S that have already been mentioned and identified. These additional functions are all accomplished and provided for in the specific embodiment substantially entirely through the programming of the main computer 31 in the main telephone and the extension computer 46 in each of the extension telephone and, except for a very few exceptions, there are no additional electronic components or subsystems in the main or extension telephones that serve specifically to accommodate these additional functions. Before describing the structure and operation of the main and extension systems to perform these additional functions (in additional to conventional functions), the H, I, P, and S functions are very briefly described below as an aid to understanding their uses and benefits.

Hold—H

Each phone in the system has a Hold key or button, H, that when pressed puts an outside call on hold if the particular phone is off-hook and in the telephone line (TL) mode (not in the I mode); and, provided further, that that phone is the only one in the system that is off-hook. The H is released by the same phone that placed the outside call on hold, going on-hook and then off-hook, or by any phone in the system that is off-hook, switching from the I to the TL mode. H can also be engaged by any of the extension phones, while engaged in an outside call, upon being unplugged from the power line during the call. This unplugging behaves just like pressing the Hold button and going on-hook.

Intercom—I

Each phone in the system has an Intercom button, denoted I or I/TL which flips the phone between the I and TL modes. In general the system is in either the TL or I mode at all times depending upon activation of the I button. An exception to this is that an extension phone, cannot go to the TL mode and place an outside call, while the main phone is in the I mode.

While any one of the system telephones is in the I mode, which is accomplished by taking the phone off-hook and pressing the I button, the other phones in the system can be signalled that they are being called for an I communication. This is done by the phone that is off-hook and in the I mode pressing "1", "2", or "0" on its key pad. The "1" is to call extension phone $E_1$, "2" is to call extension phone $E_2$ and "0" is to call the main phone (M) and each press of the button causes several buzzes (BUZ) at the phone being called for an I mode communication. Also, in this way, any of the phones can intercom buzz themselves.

Privacy—P

Each of the phones in the system has a Privacy button on the key pad denoted P. Pressing this button "locks out" any of the other phones in the system that are on-hook. In other words, it stops additional phones in the system from joining in the same mode (I or TL) as the phone that initiated P. The system does this by not enabling the microphone (Mic) and the ear phone (Ep) of the locked out phone, if the locked and phone is an extension phone; or not coupling the network 22 to the hybrid 27, if the locked out phone is the main phone.

To this situation, the main computer may add an error beep or tone if it is informed that any of the phones in the system that have been locked out by the privacy action come off-hook. This beep enters the communication to the phone or phones engaged in the privacy communication (either in the I or TL mode) and alerts those phones that the locked out phone wishes to join in. The beep is initiated by the locked out phone, by the operator of that phone pressing "1", "2", or "0" on the keypad and the operator of the phone that is so buzzed may then cancel the P situation by merely pressing his P button.

Special—S

Each of the phones of the system has a Special function button on the key pad denoted S. Included among the S features of the system is the following: either of the extension phones can silence the ring at that extension made by an incoming telephone call and can silence any and all intercom buzzes. This is accomplished at the extension phone by coming off-hook and then, while in the TL mode, pressing the S button on the key pad.

Another Special feature is the storage in each telephone computer of the last number dialed by that phone. Each phone in the system stores in its computer the last number that was dialed by that phone. For example, a typical use of this feature is when a telephone call is made by the phone and it gets a busy signal back and then the phone is hung up. Thereafter, the operator of that phone coming off-hook can redial that last number dialed by merely pressing the S button and then the "0" button. Redialing is speed dialed at about seven digits per second.

The main phone can also store a repertory of many other telephone numbers. The number of telephone numbers that can be stored depends on the power of the main computer. For example, it may store twelve additional numbers with a maximum of 160 digits, the last number dialed at the main being included among these digits. In that particular case, the numbers that are stored in the main telephone computer are entered into storage in the main computer by the operator thereof as follows: first coming off-hook; then pressing the S button; then the "#" button; then one of the twelve buttons in the top three rows of the key pad (see FIG. 14A); and then pressing the specific telephone number to be entered by pressing that number in the sequence of keys of the pad. Entry of the stored number can be stopped by either the main phone going on-hook or by pressing any of the feature buttons I, H, P or S. Automatic or speed dialing from this repertory of stored numbers can then be done from any of the telephones in the system, by that phone coming off-hook, pressing the S button and then pressing any of the buttons in the top three rows of buttons on the key pad (see FIGS. 14A and 15A). It should be noted that these buttons that initiate dialing of the stored telephone numbers include the I, H and P buttons.

In the event there is no more storage capacity left in the main computer for storing telephone numbers, the computer will either ignore the additional numbers that are attempted to store or it may produce an error beep to the earphone of the main phone.

Clearly, in the event of AC power failure, unless the main telephone is equipped with batteries, the stored telephone numbers will be lost. Also, in such a case, if the main telephone is unplugged from the AC power line, the stored telephone numbers will be lost. In the extension telephones, the last number dialed that is stored therein is lost in the event of power failure or if the telephone is unplugged from the power line, unless the extension is also equipped with battery power.

With this general understanding of the I, H, P and S features, now consider the following description of the sequences of operations performed by the main (M) and extension ($E_1$ and $E_2$) phone systems, subsystems and computers.

SYSTEM OPERATIONS—CONVENTIONAL & ADDITIONAL

Conventional operation of telephones in the system is defined herein to include placing or receiving an outside call by the main or either of the extensions and conferencing by any two or all of the three phones with an outside call. These functions are described as routines and subroutines performed by the subsystems in the M, $E_1$ and $E_2$ telephones. These conventional telephone performance routines and subroutines are listed in the function table in FIG. 7 and for each of these routines the system inputs, subsystems activated and signals produced and transmitted are listed in the tables as an aid to understanding operation of the system.

Nomenclature

Systems, subsystems and functions are abbreviated in the table and the following description as follows:

| Systems | | Touch Pad Routines | |
|---|---|---|---|
| Main | M | Dial Call Numbers for Outside or Intercom Call | D1 |
| First Extension | E1 | | |
| Second Extension | E2 | Actuate Intercom Button | I |
| Telephone Line | TL | Actuate Hold Button | H |
| Power Line | PL | Actuate Privacy Button | P |
| | | Actuate Special Button | S |

| Subsystems | Main | Ext. 1 | Ext. 2 |
|---|---|---|---|
| Hook Switch | MHk | E1Hk | E2Hk |
| Network 22 | Ntwk | — | — |
| Hybrid Circuit 27 | Hybd | — | — |
| Ringer Drive Circuit | MRng | E1Rng | E2Rng |
| Transmitter | MTX | E1TX | E2TX |
| Receiver Channel 1 | MRX1 | — | — |
| Receiver Channel 2 | MRX2 | — | — |
| Receiver Channel M | — | E1RX | E2RX |
| Subset Relay 33 | SS | — | — |
| Carrier Relay 34 | C | — | — |
| Hold Relay 35 | H | — | — |
| Main DTMF | MDTMF | — | — |
| System DTMF 38 | SDTMF | — | — |
| Dial Key Pad | MKP | E1KP | E2KP |
| Microphone | MMic | E1Mic | E2Mic |
| Earphone | MEp | E1Ep | E2Ep |

| TX Routines | | RX Routines | |
|---|---|---|---|
| Turn On Transmitter | TX | Produce RF Carrier | RF |
| Add CODE | CD | Status Signal | |
| Transmission of Received Signals | RX | Detect CODE | CD |
| | | Receiver Out Enable | En |
| Transmit DTMF | DTMF | System DTMF Signal | DTMF |
| | | Add Tone (E1, E2) | Tn |

Note that the same nomenclature applies to systems, subsystems and routines and each of the phones, except that at the extensions $E_1$ and $E_2$: M is replaced by $E_1$ or $E_2$; there is no RX input into the transmitter, but instead there is the extension handset microphone (Mic) input enabled, referred to as MicEn; the output of the receiver enables the handset earphone (Ep) and when enabled is called EpEn; and a tone is sometimes added to the output of the receiver and indicated as Tn. At both the main and the extensions, intercom signalling is referred to as a buzz (BUZ) and indicated as the function BUZ. The above symbols are used to describe systems, subsystems and routine functions as columns along the top of the table and are also used to define the routines, subroutines and responses as rows along the left side of the table.

Before describing these routines for performing the conventional and additional functions (defined herein), consider the telephone line interface subsystem 21 shown in FIG. 5 and its operation to effect the I and TL modes and H for various combinations of M, $E_1$ and $E_2$ engaged in I and TL modes. The table below shows columns that represent the status of the subset (SS) relay 33, carrier (C) relay 34, hold (H) relay 35, main hookswitch (MHR) 33, network (Ntwk) 22 and hybrid (Hybd) 27 for the routines listed as rows. The status of each circuit is indicated as + or —. For the relays, the + indicates, that the relay is actuated and the — that it is not actuated, for the main hookswitch the + indicates off hook and the — indicates on hook and for the network and hybrid the + indicates that it is active to conduct signals between the telephones of the system and the telephone line in the I or TL mode, whereas — indicates that it is not so active.

| Telephone Line Interface Operations | | | | | | | |
|---|---|---|---|---|---|---|---|
| | C | SS | H | MHk | Ntwk | Hybd | TL |
| M--TL | — | — | — | + | + | + | — |
| M--TL, (E1 + E2) — I | — | — | — | + | + | + | — |
| (M + E1)--TL | + | — | — | + | | | TL |
| (M + E1 + E2)--TL | + | — | — | + | | | TL |
| (E1 + E2)--TL | + | + | — | — | — | | TL |
| H--TL, (M + E2) — I | — | + | + | + | | | 12 V |
| H--TL, (M + E1) — I | — | + | + | + | | | 12 V |
| H--TL, (M + E1 + E2) — I | — | + | + | + | | | 12 V |
| H--TL, (E1 + E2) — I | — | — | + | — | — | — | |
| Nothing | — | — | — | — | — | — | |

As shown by the table above, when M and $E_1$ and/or $E_2$ are in the I mode together, Ntwk and Hybd are both + and in series with 12 volts from the power supply across the series. The table also shows that when M and $E_1$ and/or $E_2$ are in the TL mode, Ntwk and Hybd are both activated and in parallel across the telephone line. When any of the routines listed in the table are called for, the main TX-RX computer 31 is programmed by received CODE and other inputs to the computer to control the C, SS and H relays as indicated in the table. For this purpose, as shown in FIG. 5, the computer 31 outputs include signals in lines denoted C, SS and H to relay control amplifiers 34a, 33a and 35a that control the solenoids 34b, 33b and 35b of the relays 34, 33 and 35, respectively.

Conventional Function Operation

Figure 7:
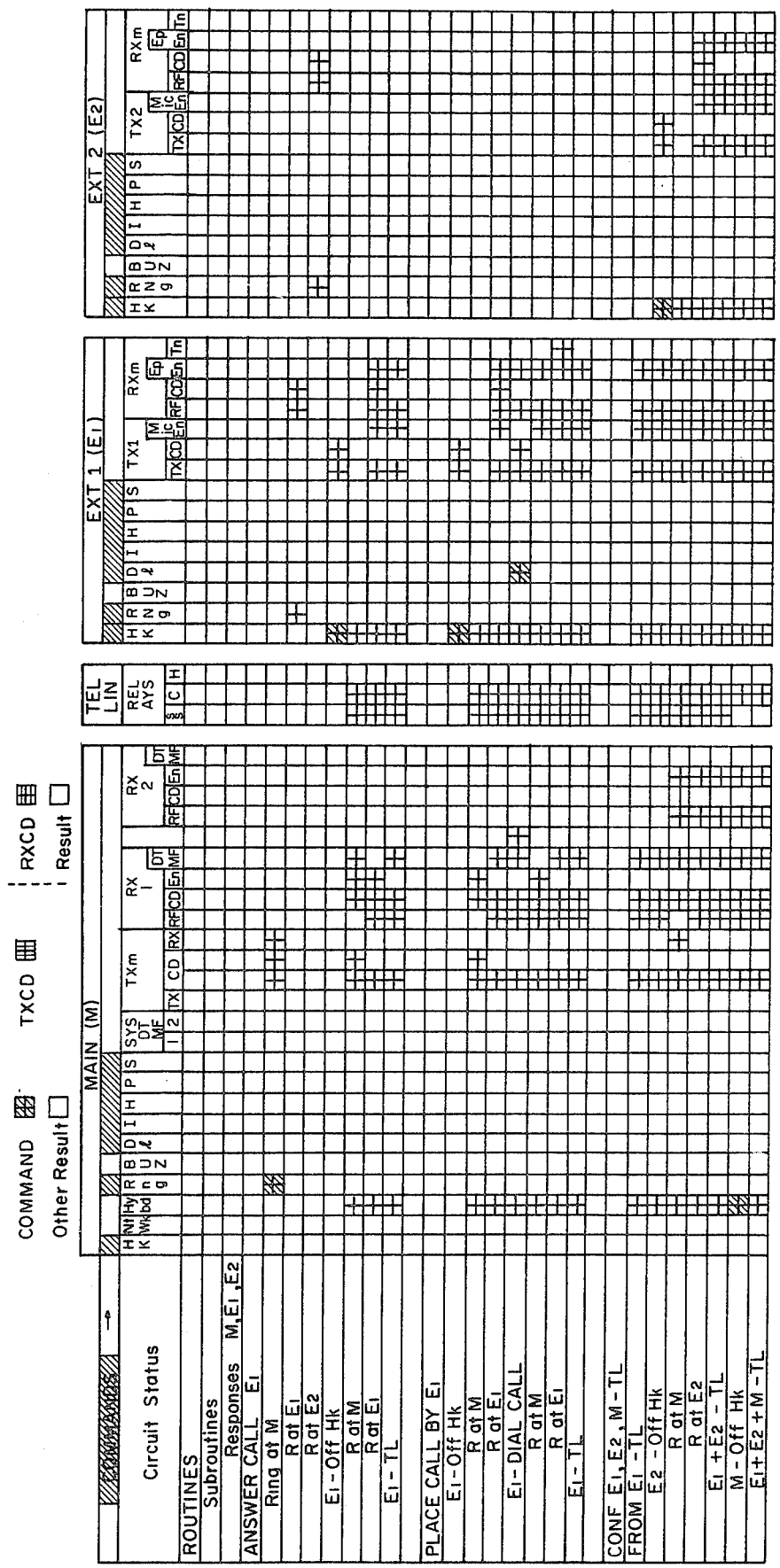

Refer next to FIG. 7 along with FIGS. 5 and 6 and the interface operations table above. The table in FIG. 7 shows the routines and subroutines and responses, R @ M, $E_1$ and $E_2$, for performing conventional functions by the three phones of the system. The functions shown by the table in FIG. 7 are:

Answer call by $E_1$;

Place call by $E_1$; and

Conference $(E_1+E_2+M)$ —TL.

For these routines a + under the column of subsystem or function indicates that the subsystem or function is active and a blank indicates that it is not active (the same as a minus). Under Place Call by $E_1$, the first subroutine is $E_1$- Off Hook, which is an input command into the system and $E_1$ responds by TX and CD. In response to this, at M, RX1 receives RF and CD and computer 31 actuates C and SS and turns on transmitter 25 to TXCD to $E_1$ through the Hybd. Here, it should be noted that when C and SS are both +, Hybd is connected across TL and the CD transmitted to $E_1$ is received at $E_1$ (as indicated by R @ $E_1$) where $E_1$ receives RF and CD and, as a result, the computer 46 at $E_1$ sends an EpEn signal to its receiver 42 and sends a TX and an MicEn signal to its transmitter 44. The effect of all this is to store at the main computer 31 the off hook status of $E_1$, connect hybrid 27 across the telephone line 1, turn on the transmitter at $E_1$ and enable the microphone and earphone in the handset at $E_1$ and so the operator at $E_1$ hears a telephone line dial tone from the telephone line in his earphone indicating that he may then dial a number.

The next subroutine is $E_1$-Dial, which is an input command at $E_1$ and is initiated by the operator punching keys on keypad 53 that are fed to $E_1$ computer 46 which turns them into CODE (CO) that is transmitted by transmitter 44 to M. The response at M is to receive the CODE including the code byte for the number dialed at $E_1$, detect it and feed the detected CODE to the main computer 31. In this process denoted R @ M, RX1 output is disabled and the system DTMF 36 converts the received code to dial tones that are sent in line 36a to the output of receivers 26 and fed in that output to hybrid 27, to the telephone line. The same tones are also fed to the input of main transmitter 25 and sent back to $E_1$, where they are received at the earphone of $E_1$ as tones and so the operator at $E_1$ can hear the tones he is dialing. This is indicated in the table by R @ $E_1$. Thereafter, when the dialed call goes through, the routine Place Call by $E_1$ is completed.

The next routine shown in the table in FIG. 7 is Answer Call by $E_1$. This routine begins with the input command Rng at M which transmits ring code to $E_1$ and $E_2$. The R @ $E_1$ is to receive the ring code and process it in the computer 46 producing a signal in line 47a to turn on drive circuit 47 that drives the speaker 48. These signals in line 47a from the computer cause the speaker to produce a distinct audible sound indicating an outside call ring. The next subroutine is $E_1$-off hook which commences with the off hook input command at $E_1$ and $E_1$ transmits CODE indicating this status. The R @ M is to received that CODE, enable RX1 and actuate C and SS placing Hybd across the TL. In addition, the main transmits CODE to $E_1$ and the R @ $E_1$ upon receiving this is to enable the Mic and Ep at $E_1$. When that occurs, the status $E_1$-TL is achieved and so $E_1$ has answered the incoming telephone call.

The routine for conferencing (Conf) between $E_1$, $E_2$ and M and the telephone line continues from the status of $E_1$-TL. The first step in this routine is $E_2$-Off hook and then M-Off hook. The subroutines and responses involved in these procedures can be followed from the table.

I Mode Operations

Figure 8:
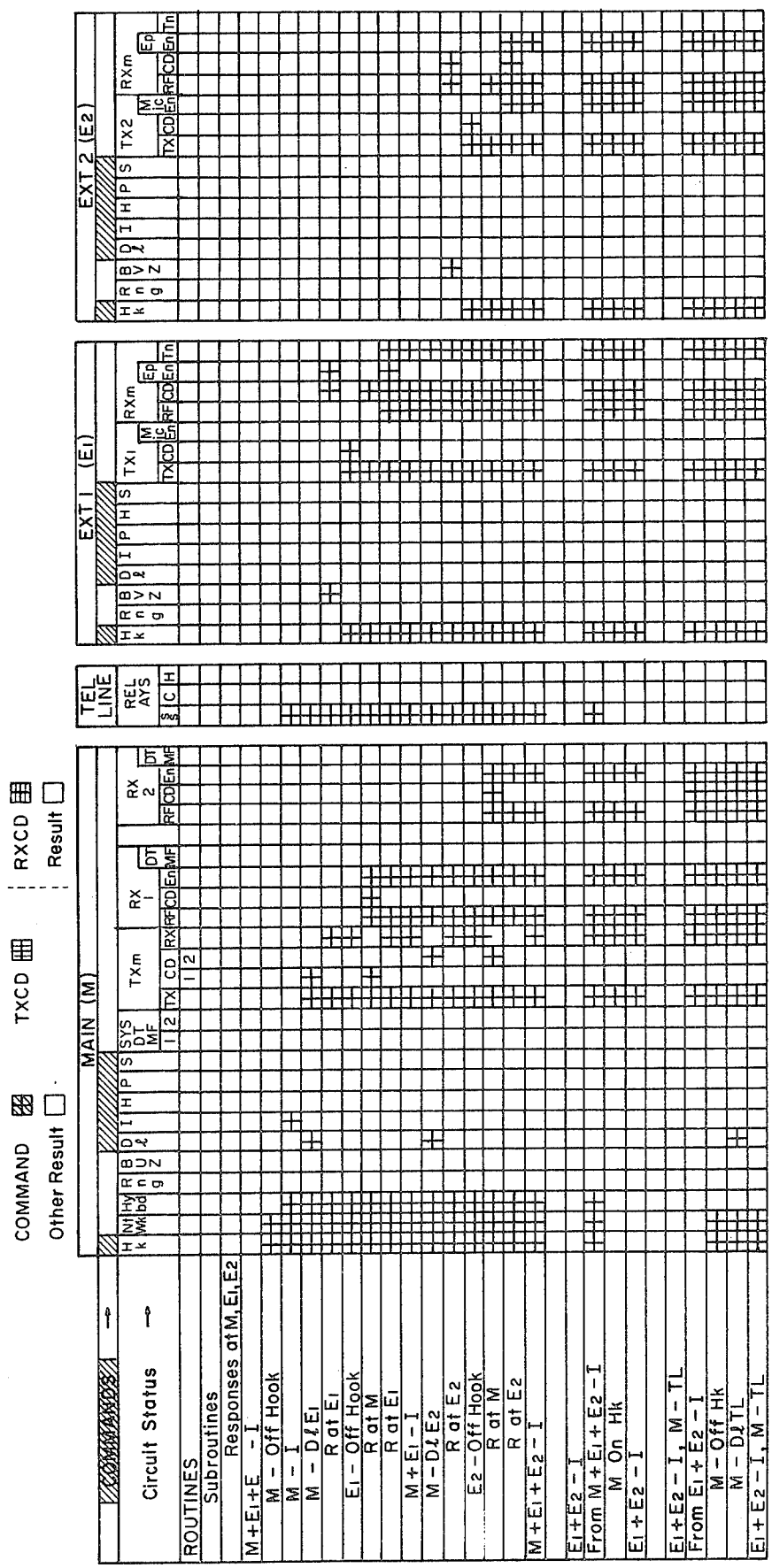

The table in FIG. 8 shows the routines, subroutines and responses to accomplish each of the following:

$(M+E_1+E_2)-I$ $(E_1+E_2)-I$ $(E_1+E_2)-I, M-TL$

In the first of this series of routines, the starting routine status is with M, E1, and E2 all on-hook. In the first of this series of routines, the starting routine status is with M, E1 and E2 all on-hook. In the last of these routines, the starting point is with $E_1$ and $E_2$ in the I mode when an incoming ring signal from the telephone line occurs, whereupon M comes off hook to answer the incoming call. Having followed the routines, subroutines and responses described in detail with reference to the conventional functions in the table in FIG. 7 and being mindful of the operation of interface 21 as shown in the table on page 34, one should have no problem in following all steps in detail shown in FIG. 8.

H Function Operations

Figure 9:
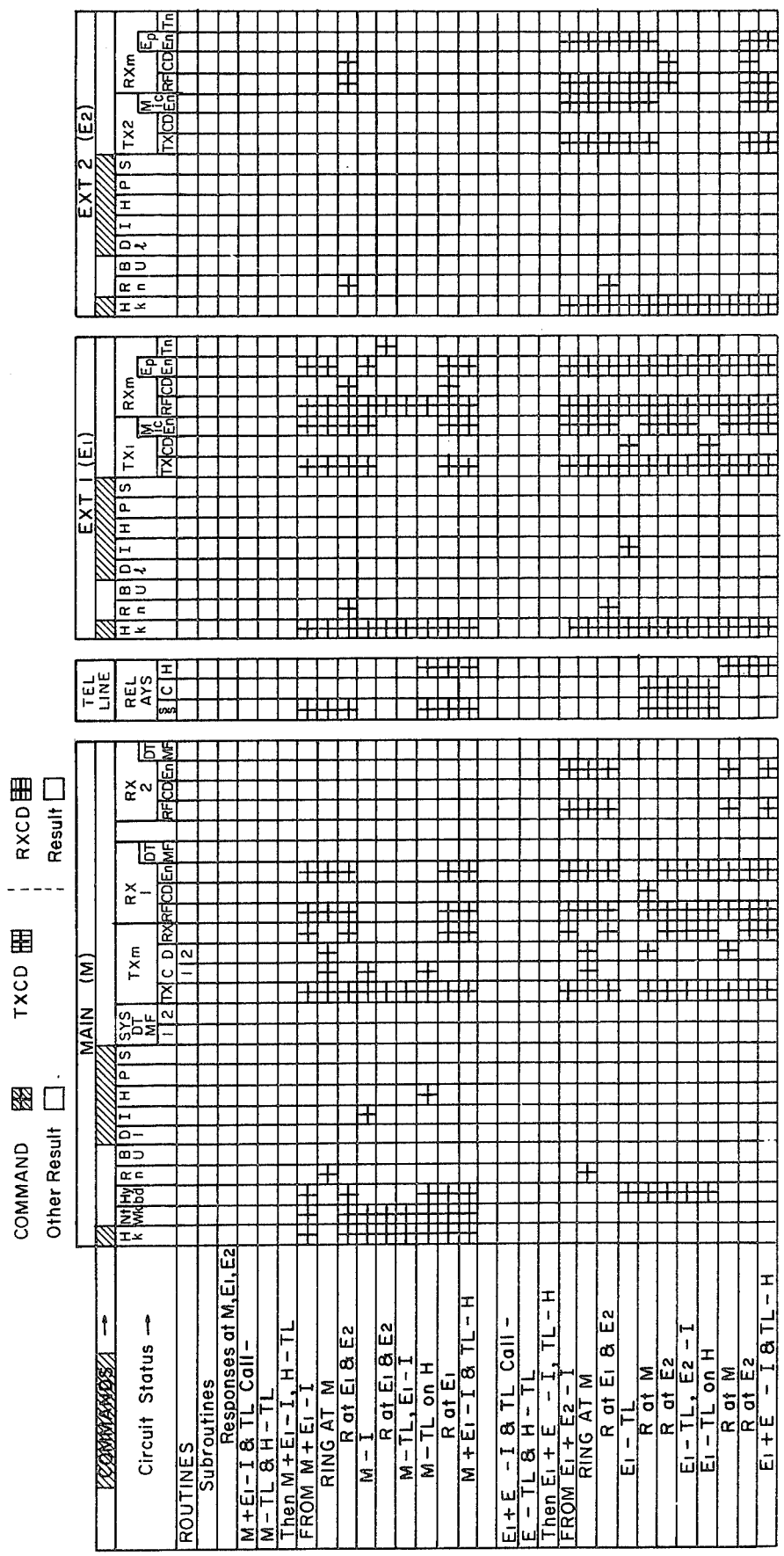

The table in FIG. 9 describes the routines, subroutines and responses for performing the following uses of the H feature:

$H-TL$ by M and $(M +E_1)-I$ $H-TL$ by $E_1$ and $(E_1+E_2)-I$ $H-TL$ by M and $(E_1+E_2)-I$ It should be noted here that any time the telephone line is in hold, whether initiated by the main or an extension, Ntwk and Hybd are both active and in series with 12 volts from the power supply across the series while the hold relay impedance 35c is across the telephone line. In this situation any combination of intercom calls can be made between M, $E_1$ and $E_2$. During the H-TL status, any of the above intercom situations are possible, however, only M, being not engaged in I (the last situation) can come off hook into the TL mode and cancel the H. This means that if while H-TL, M and $E_1$ are in I and $E_2$ comes off hook, I is cancelled and all three phones are placed in the TL mode.

P Function Operations

Figure 10:
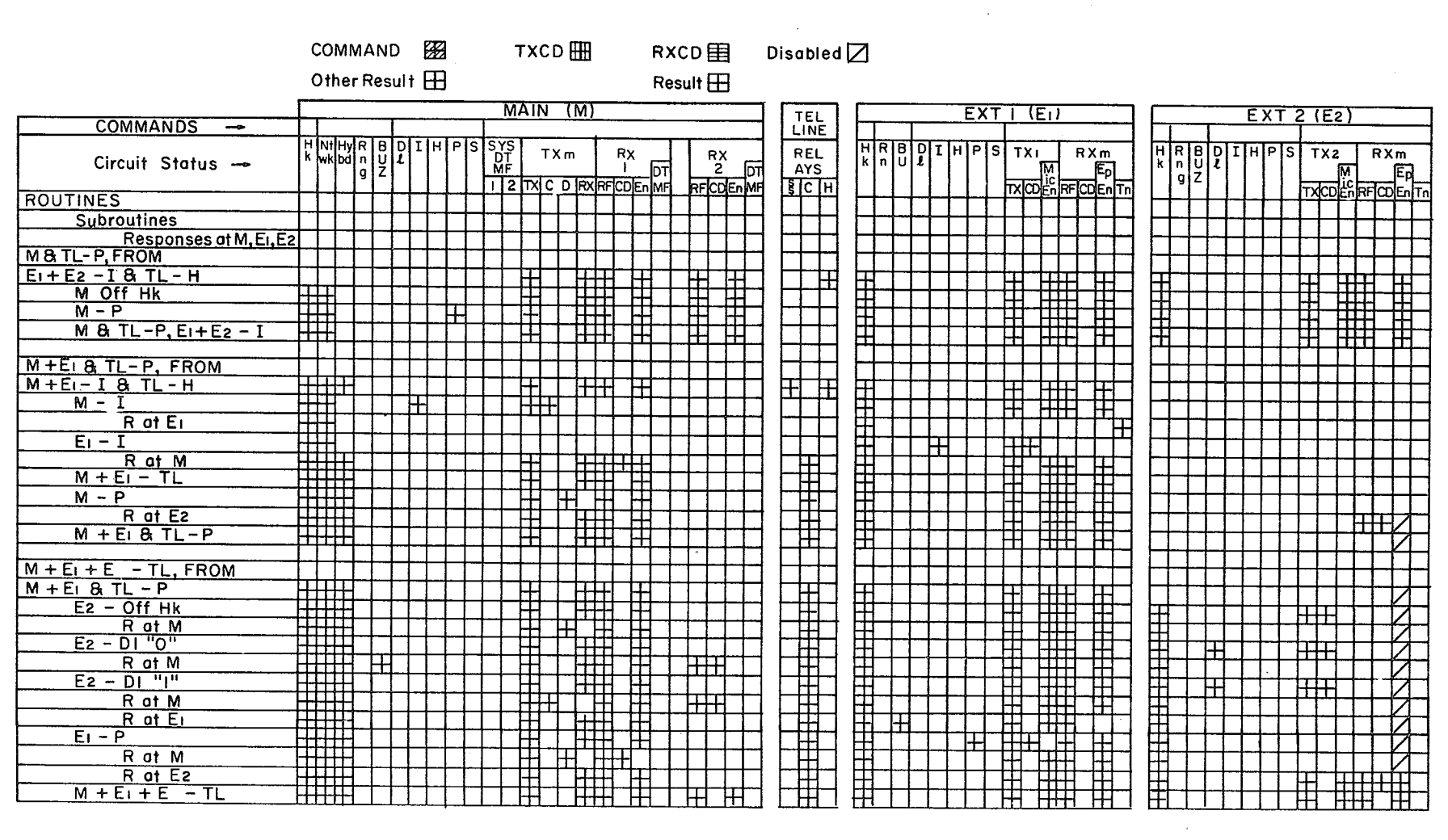

Various P function routines are shown in the table in FIG. 10. These routines include the following:

P between M and TL

P between M, $E_1$ and TL

P between $E_1$ and TL

P between $E_1$, $E_2$ and TL

P between M and TL while ($E_1$ and $E_2$)—I.

In any of the above situations, the system phone that is locked out can come off hook and alert the others that it wishes to join in. This is done simply by the locked out phone coming off hook and the operator pressing 1, 2 or 0 on the keypad to signal whichever of the other phones it wishes to request that the lock out be cancelled. This routine is shown in the last of the above listed. It should be noted that when M and $E_1$ are in the I mode and either of them initiates P, that $E_2$ is lock out and so if $E_2$ comes off hook it is locked out of the I and it has no access to TL. On the other hand, if $E_1$ and $E_2$ are in the I mode and either presses P, the main M is locked out of the I, but if M comes off hook it is automatically in the TL mode and M can then be switched by its operator to the I mode and request to join the intercom. This sequence is also shown in FIG. 10.

S Function Operations

Figure 11:
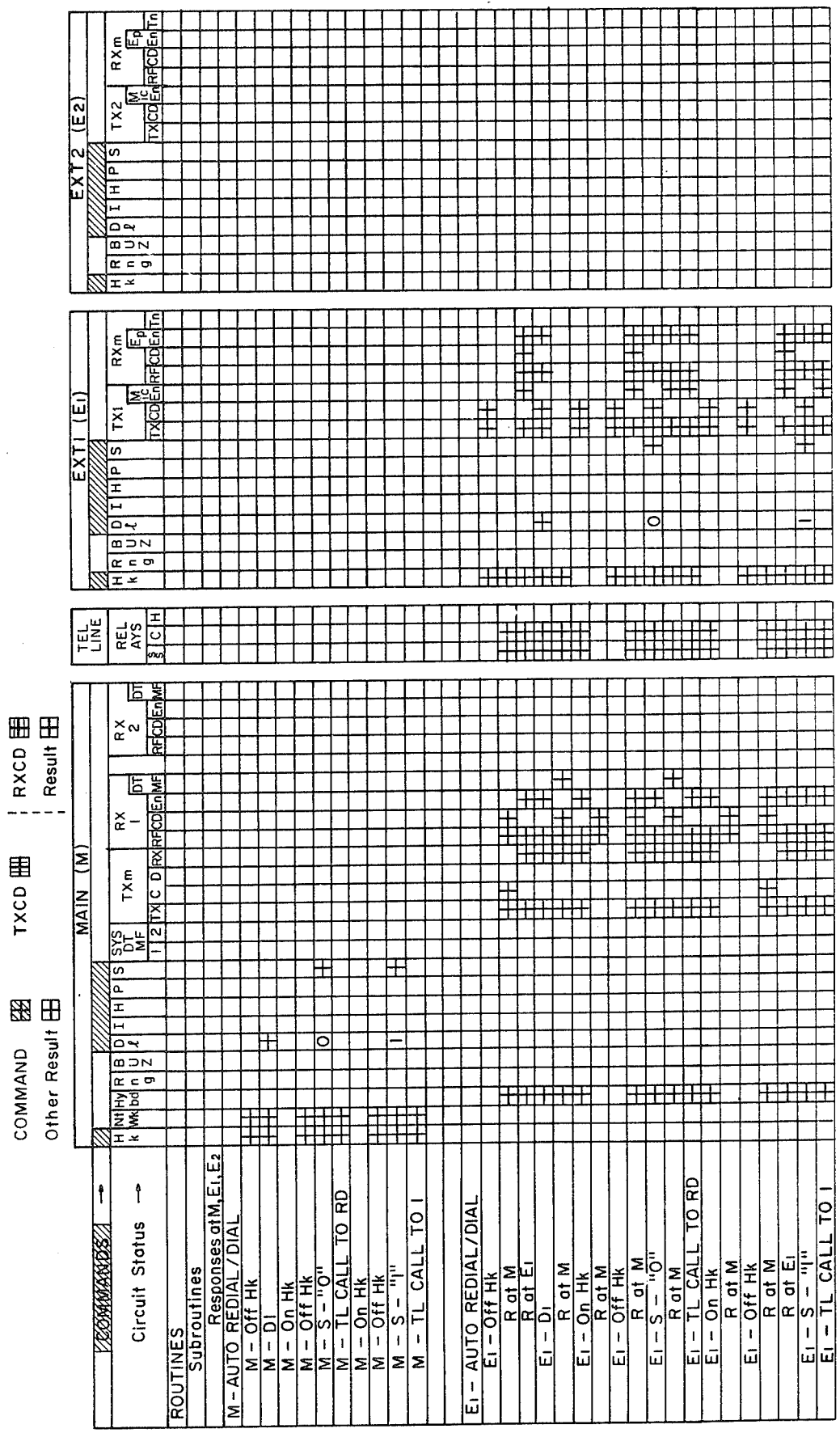

The S function is initiated by any of the phones by coming off hook in the TL mode and the operator pressing the S button. It is used to either redial the last number dialed by that phone or to dial out one of the stored telephone numbers among a reperatory of stored telephone numbers stored at the main computer. Several routines involving the S feature are described in the table in FIG. 11. They include the following:

S by M—last number redial;
S by M—dial reparatory number;
S by $E_1$—last number redial;
S by $E_1$—dial reparatory number.

M and E Computers and Codes

The CODE part of the transmitted data (TXDATA) including Address Byte, Code Byte and Checksum Byte shown by the waveforms in FIG. 2 is suitable for the power line carrier telephone extension system described herein as the specific embodiment and shown particularly by the electrical block diagram in FIGS. 5 and 6. As this CODE is used in the telephone extension system, the Address Byte is an 8 bit binary number of which the user manually sets 4 bits and the other 4 bits are fixed (or preset in production). The user sets 4 bits of the $E_1$ address and 4 bits of the $E_2$ address by the address set switches 38 at the main telephone. The user then sets the same 4 bits of the $E_1$ address in address set switches 54 at $E_1$ and the same 4 bits of the $E_2$ address in address set switches 54 at $E_2$. By setting the address set switches in this way, the transmitted Address Byte that is part of the transmitted CODE from a telephone matches the Address Byte that will be recognized in received CODE at the telephone for which the transmission is intended and unless the received CODE includes that Address Byte, the receiving telephone's computer will not allow its receiver to respond to the DATA that accompanies the CODE.

This technique of setting the Address Byte provides versatility and assures that the Address Bytes set at M will be matched to those at $E_1$ and $E_2$, even if the user does not set anything, because the bits set in production will provide sufficient address. For example, for a given system of M, $E_1$, and $E_2$, the 4 bits of the $E_1$ and the $E_2$ addresses set in production (at the factory) may be the bits: 1000 and 0100, respectively, and the manual set switches in the phones all begin at 0000. This system will perform in all respects as described herein, even if the user (customer) fails to set the switches, because the $E_1$ address set at both $E_1$ and M will be 1000000 and the $E_2$ address set at both $E_2$ and M will be 01000000. Clearly, however, it is necessary where the user elects to set four bits of the addresses of $E_1$ and $E_2$ that he sets $E_1$ the same at M and $E_1$ and he sets $E_2$ the same at M and $E_2$. It is also clear that the four bits manually set by the user can be the same for $E_1$ and $E_2$ and the system will still perform in all respects as described herein (because the factory set bits will be different). Thus, the bits (four bits for $E_1$ and four bits for $E_2$) that can be manually set at M, could be accomplished by a single set of four switches that manually set the same four bits for $E_1$ and $E_2$; and, correspondingly the same four bits would be manually set in $E_1$ and $E_2$. An advantage may lie in having the user manually set all the system phones the same and refer to the setting as the user's address.

The first purpose of the Address Byte is to distinguish data transmitted from M, by RF carrier Fm as intended for $E_1$ or $E_2$ (or both). Another purpose is to distinguish between system data on Fm and signals from other systems also on Fm. For example, if the probability of neighboring premises with such telephone extension systems both having the same Fm is 1:10; then the probability that both will have the same Fm and the same factory set four bits for $E_1$ or $E_2$ is $1:10 \times 2:2^4$ or 1:80; and the probability that both will have the same Fm, the same factory set four bits and the same manually set four bits for $E_1$ or $E_2$ is $1:80 \times 2:2^4$ or 1:640.

The Code Byte part of CODE is generated by the computer in each phone depending on commands by each phone and commands received at that phone from the other phones and stored in the computer. As already described with reference to FIG. 2 the Checksum Byte merely confirms that the Address and Code Bytes are received as sent. With this format in mind, M, $E_1$ and $E_2$ Code Bytes for various commands can be set up as shown in the table 2 below.

| Extension (E) Command/Message | 1st 5 Bits Code Byte | Main (M) Command/Message |
|---|---|---|
| E Off Hk | 11111 | EnMic-On |
| E On Hk | 01111 | EnMic-Off |
| E On I | 10111 | EnEp-On |
| E Off I | 00111 | EnEp-Off |
| E D1 1 | 10000 | MD1 1 |
| E D1 2 | 01000 | MD1 2 |
| E D1 3 | 11000 | MD1 3 |
| E D1 4 | 00100 | MD1 4 |
| E D1 5 | 10100 | MD1 5 |
| E D1 6 | 01100 | MD1 6 |
| E D1 7 | 11100 | MD1 7 |
| E D1 8 | 00010 | MD1 8 |
| E D1 9 | 10010 | MD1 9 |
| E D1 0 | 01010 | MD1 0 |
| E D1 * | 11010 | MD1 * |
| E D1 # | 00110 | MD1 # |
| E On H | 11011 | M On H |
| E Off H | 01011 | M Off H |
| E On P | 10011 | M On P |
| E Off P | 00011 | M Off P |
| E On S | 11101 | M On S |

Examination of the routine tables for performing the various functions of the telephone system and shown in FIGS. 7 to 11, reveals that when a transmitter in any of the phones transmits CODE, the input to the transmitter (from the receivers in the main or from the microphone in an extension) are disabled and immediately following the transmission of CODE, if transmission continues, the input to the transmitter is enabled again. This is shown also by FIG. 2: during the 31.68 milliseconds that CODE is transmitted, VOICE is not transmitted. Clearly this 31.68 milliseconds is not perceived as an interruption by the user, because the period is so brief.

M AND E POWER LINE COUPLERS (ADAPTER PLUGS)

Figure 12:
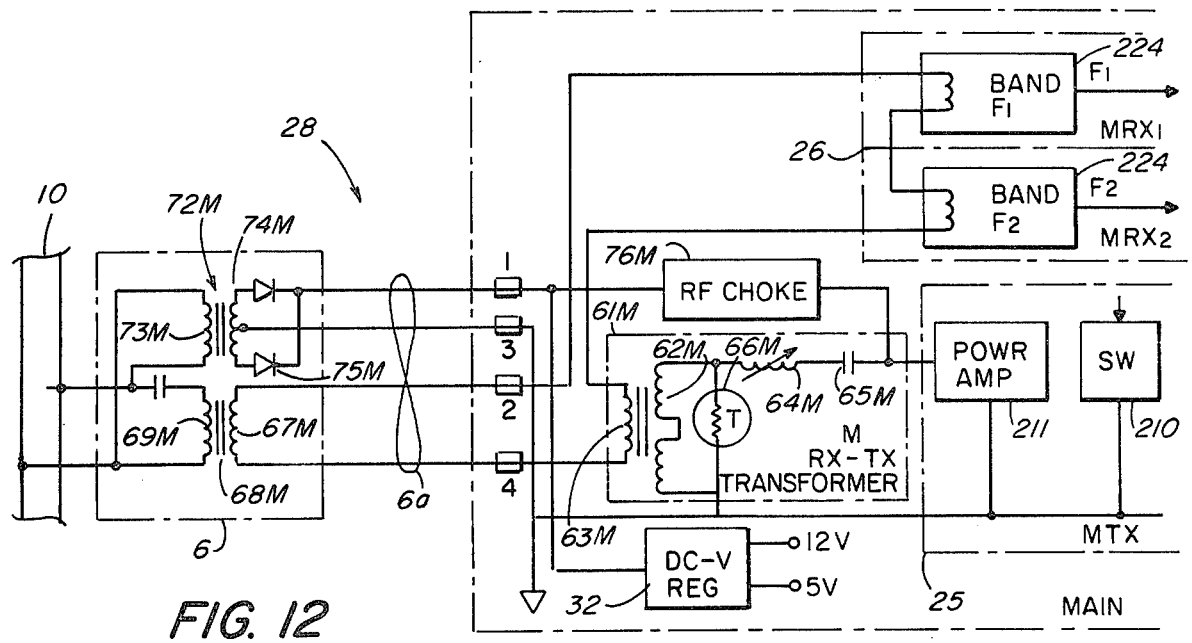
FIG. 12 is an electrical diagram showing the main telephone power line coupler circuit, for connecting the main telephone to the power line.
Figure 13:
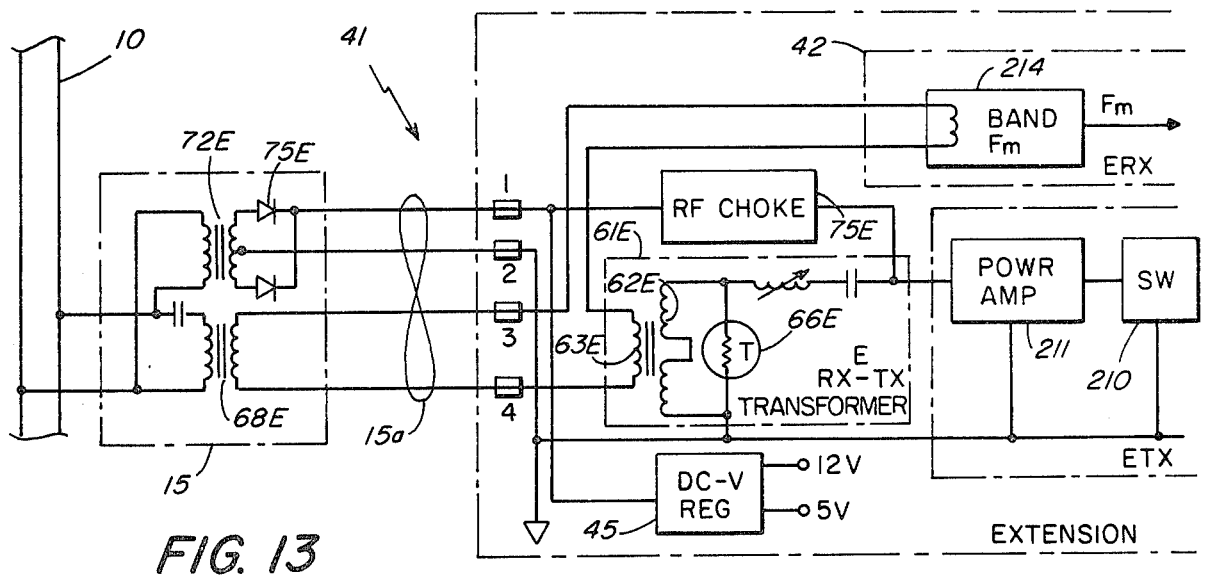
FIG. 13 is an electrical diagram showing the extension telephone power line coupler circuit that connects an extension telephone to the AC power line.

The main telephone power line coupler circuit 28 is shown in some electrical detail in FIG. 12 and the extension power line coupling circuit 41 is shown in FIG. 13. These figures shown circuit details of parts of the coupling circuits in the phones and parts in the adapter plug. In both cases the power line 110 VAC stops at the adapter plug and so the cord (see FIG. 4) from the phone to the adapter plug, which can be of considerable length to allow freedom of movement of the telephone even while it is plugged in, carries all power and RF signals between the phone and the power line and all of this is at relatively low voltage and low power and so the phone itself is intrinsically a safer instrument than it would be if the cord carried 110 VAC into the phone envelope.

Turning first to FIG. 12, for the main phone, the power line coupling circuit 28 of FIG. 5 is comprised of the RX-TX transformer 61M located inside the main phone envelope, the cord 6a from the main phone and the adapter plug 6 that plugs into a conventional AC power line receptacle. The adapter plug 6 contains as little of the circuitry of the coupler as is necessary to insure that the 110 VAC is isolated from the telephone at the plug, so that the plug can be of small, convenient size.

The output of the main transmitter (MTX) power amplifier to 211, is fed to the RX-TX transformer 61M and the inputs to each of the channel 1 and channel 2 receivers (MRX1 and MRX2 in 26) is taken from this transformer. In particular, the main RX-TX transformer includes a primary coil 62M and secondary 63M, the output of the transmitter being coupled to one side of this primary via the variable inductance 64M and capacitance 65M in series and the other end of the primary goes to ground. A thermistor 66M may be connected across this primary to shunt excessively high primary current to ground and so protect the transformer. The inputs to each of the receivers in 26 are coupled in series, as shown, with the secondary 63M of the RX-TX transformer and this coupling is into the band pass filters of the two receivers and may be by coupling coils in the filters as shown. Thus, the secondary 63M is in series with the inputs of the two receivers across the terminals 2 and 4 of the main phone that connect to terminals 2 and 4 of the cord 6a. The other end of this cord, at the adapter plug 6 that correspond to the terminals 2 and 4 is across the secondary 67 of transformer 68M in the plug and in the primary 69 of that transformer connects to the power line 10, one end of that being connected to the power line via capacitor 71M. By this structure the transmitted RF from the main is launced into the power line and RF signals carried by the power line are coupled from the power line to the two receivers in the main phone.

The main phone power supply, regulator 32 provides all operating power for the main phone except power derived from the telephone line for operating parts of the telephone line interface system 21 and for operating the main DTMF 37 as already described. The power supply 32 produces 12 volts and 5 volts DC for operating the systems and subsystems in the main phone. Power to regulator 32M comes from transformer 72M in the adaptor plug. The primary side 73M of that transformer connects directly across the power line and the secondary has a center tap that is carried by cord 68 to terminal 3 in the main phone that provides the main phone ground while the two ends of the secondary are connected together via diodes 75M, as shown, providing rectified positive voltage that is carried by cord 6a to terminal 1 in the main phone and terminal 1 feeds the input to voltage regulator 32. Thus, regardless how the adaptor plug is plugged into the power line 10, terminal 1 gets full wave rectified positive voltage for the main phone regulator. In order to insure that the DC level at the output of the transmitter and at the input of the regulator is the same and yet block RF flow between the two, RF choke 76M is provided, which short circuits DC and blocks RF (shunts it to ground).

The power line coupling circuit 41 in the extension telephone (FIG. 6) is shown in detail in FIG. 13. This circuit also includes parts in the extension telephone envelope, parts in the adaptor plug 15 and the cord 15a from the phone to the plug. The principle parts of this circuit are the RX-TX transformer 61E in the extension phone, the cord 15a and the two transformers 68E and 72E in the adaptor plug 15. The parts included herein may be the same and have the same functions as the equivalent parts described above with reference to the main power line coupling circuit 28. Similar parts bear the same reference number followed by M or E. The only substantial difference between this coupling for the main and the extension phones, is that the extension has only a single receiver, ERXn, (a channel m receiver) instead of two receivers. Clearly it is of some advantage that adaptor plug 6 and its cord 6a for the main phone be identical to adaptor plug 15 and its cord 15a for an extension phone, inasmuch as the cords and plugs are then interchangeable.

M AND E KEYPADS

The main phone keypad (29 in FIG. 5) carry the operating buttons as shown. These include the conventional telephone Touch Tone 1 through 9, 0, *, and # buttons, and in addition to these it carries the intercom denoted (I), the hold (H), the privacy (P), and the Special function (S) buttons. A pictoral view of the keypad 29 is shown by FIG. 14A. Electrical diagrams 14B and 14C and their associated tables 14D and 14E, respectively, show the system and telephone line operating functions of the main keypad. The telephone line operation described by FIGS. 14C and 14E occur when the main telephone is operated outside of the system; more particularly when it is operated without AC power and while plugged into the telephone line only. For this operation, all power to the phone is derived from the telephone power line and the operation is essentially conventional.

For conventional operation, only the conventional keys 1 to 9, 0, *, and # are operational through pins 1 to 8 of the output terminal board 29a of the keypad. The interconnections between these pins, accomplished by pressing the various keys of the pad, are listed in the table in FIG. 14E and shown diagramatically by FIG. 14C. For example: when key 1 is pressed, row 1 and column 1 are connected and so pins 2 and 3 are connected; when key 2 is pressed, row 1 and column 2 are connected and so pins 2 and 5 are connected and so forth. Thus, upon pressing each of the keys in the touch pad, different combinations of rows and columns are connected (short circuited). These rows and columns are denoted R1, R2, R3, R4 and C1, C2, and C3 herein. Clearly, when R3 connects to C2 the indication is only that key 8 is pressed. This telephone line operation of the main keypad activates only the main DTMF 37 (see FIG. 5) and so the connection from the keypad to the main DTMF is of only R1, R2, R3, R4, C1, C2, C3 and Common.

Turning next to FIGS. 14D and 14E there is shown the operation of the main keypad in the system mode when the main is plugged into the power line and the systems and subsystems of the main are energized by the main regulator 32. In this case, all of the keys including the I, H, P, and S keys are active and the actuation of these keys is defined by R1, R2, R3, R4, C1, C2, C3, C4 and the Common. In this case pins 9 to 17 of the output pad 29a are also activated and so all 17 output pins of the pad 29a are activated. For example, when key 1 is pressed, pins 2 and 3 are connected and also pins 16 and 13 are connected. When the I is pressed, none of the pins 1 to 8 are connected, but pine 9 to 16 are connected.

The connections between the main keypad 29 pins 1 to 17 and the main DTMF 37 and the connections to the system DTMF 36 and the main computer 31 are explained further hereinbelow with reference to FIG. 16, which describes also the operation of the address code set switches 38 in the main phone.

The extension keypad 53 shown in FIG. 6, the electrical connections between the keys and the output pins of the keypad output terminal board 53a are illustrated by FIGS. 15A, 15B, and 15C. For the extension, there is only system operation, because the extension phone is not operable unless plugged into the power line and so all sixteen keys on the pad are operable at all times. Here, the output pins are denoted 1 to 9 and they connect to the rows R1 to R4 and columns and C1 to C4 as listed in the table in FIG. 15C. Thus, when key 1 is pressed, pins 9, 3, and 8 are short circuited and when key S is pressed, pins 9, 4, and 7 are short circuited, and so forth.

Here again, as for the main telephone keypad, the keypad outputs are designated by their row and column symbol rather than the pin and the pin designation is described only with reference to these figures. The pin designation is not carried through in the descriptions of operations of the keypad system elsewhere herein. The electrical connections between the extension keypad 53 and the extension computer 44 and extension address set switches 54 is described more fully hereinbelow with reference to FIG. 17.

M AND E ADDRESS CODE SET SWITCHES

At the main phone, four bits of the address bytes of $E_1$ and $E_2$ are set by the switches 38 and at each of the Extension phones, the same four bits are set by the address switches 54. The purpose of these settings is discussed above. Briefly, the purpose is to give the user the opportunity to change the addresses. The occasion might arise to change the addresses in the event of interference from other sources, such as a neighbors power line telephone system of the same design as the users.

It is convenient at both the main and the extension to set the four bits of the addresses into the computer using the same lines that feed the key signals from the keypad into the computer and this is the way it is done at both the main and extension.

Figure 16:
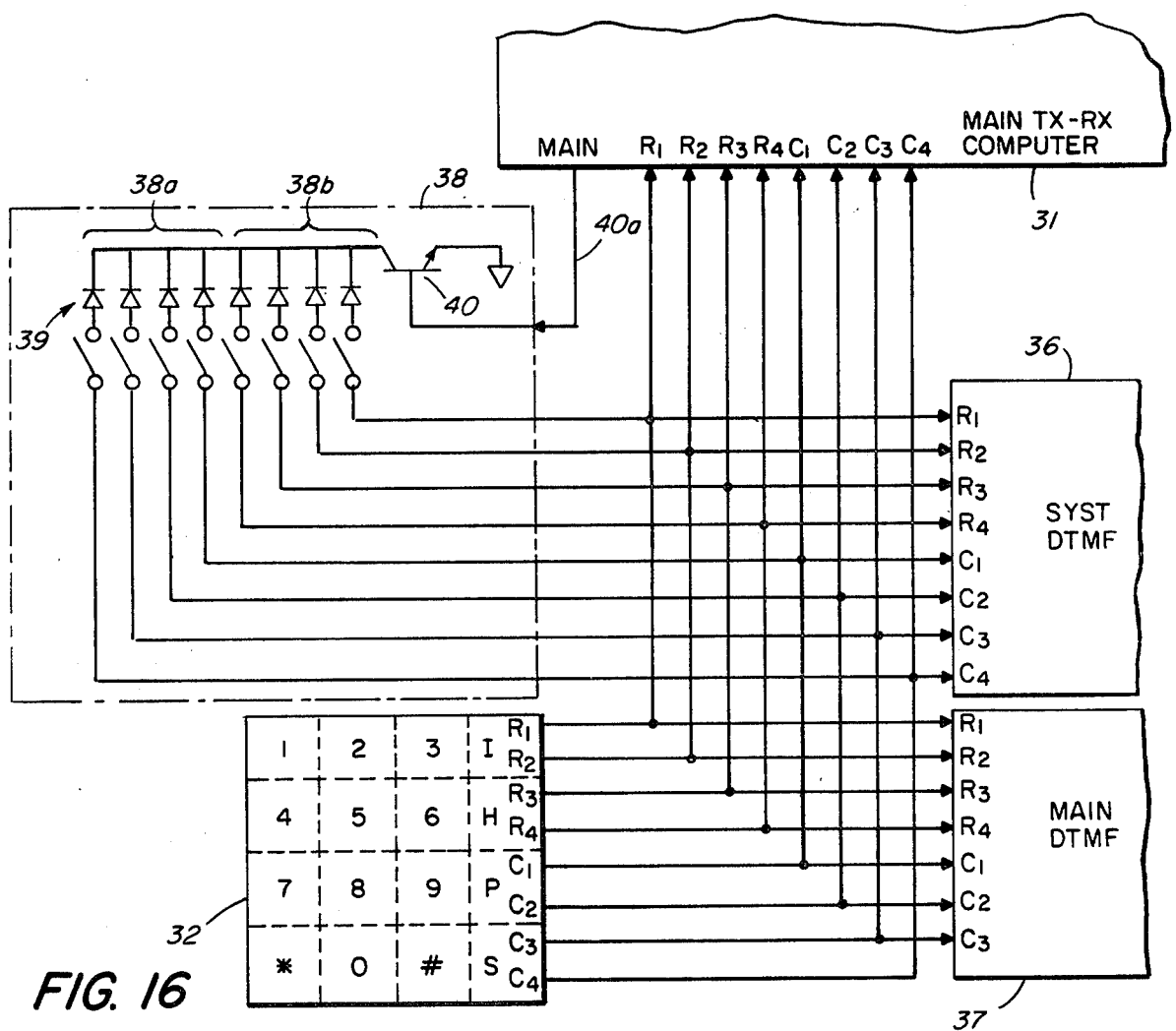
FIGS. 16 and 17 show electrical details for the extension address set switches at the main and extension telephones, respectively.

Turning first to FIG. 16 there is shown the main keypad 29, main DTMF 37, system DTMF 36 and the extension address set switches 38. There are two banks of these switches 38a and 38b, of which 38a is for setting the four bits of the address of $E_1$ and 38b is for setting four bits of the address of $E_2$. All the switches, when closed, draw current through a diode, denoted generally 39, when transistor 40 is enabled by a signal in line 40a from the main computer. This enable signal occurs very briefly every time the main computer is reset and the main computer is reset every time there is an interruption of power from the power line to the telephone, followed by a continuation again of power. Hence, whatever the switches are set at, just before the telephone is plugged into the power line, that setting is stored in the computer. It is convenient to feed that setting into the computer via the lines denoted R1 to R4 and C1 to C4 from the keypad. In the main telephone, as shown in FIG. 16, all eight of the lines, R1 to R4 and C1 to C4 are used. Immediately following initiation of power from the power to the telephone, the transistor 40 is no longer enabled and the switches play no part and have no effect on the signal flow between the main keypad 29, the system DTMF 36, the main DTMF 37 and the computer 25.

Figure 17:
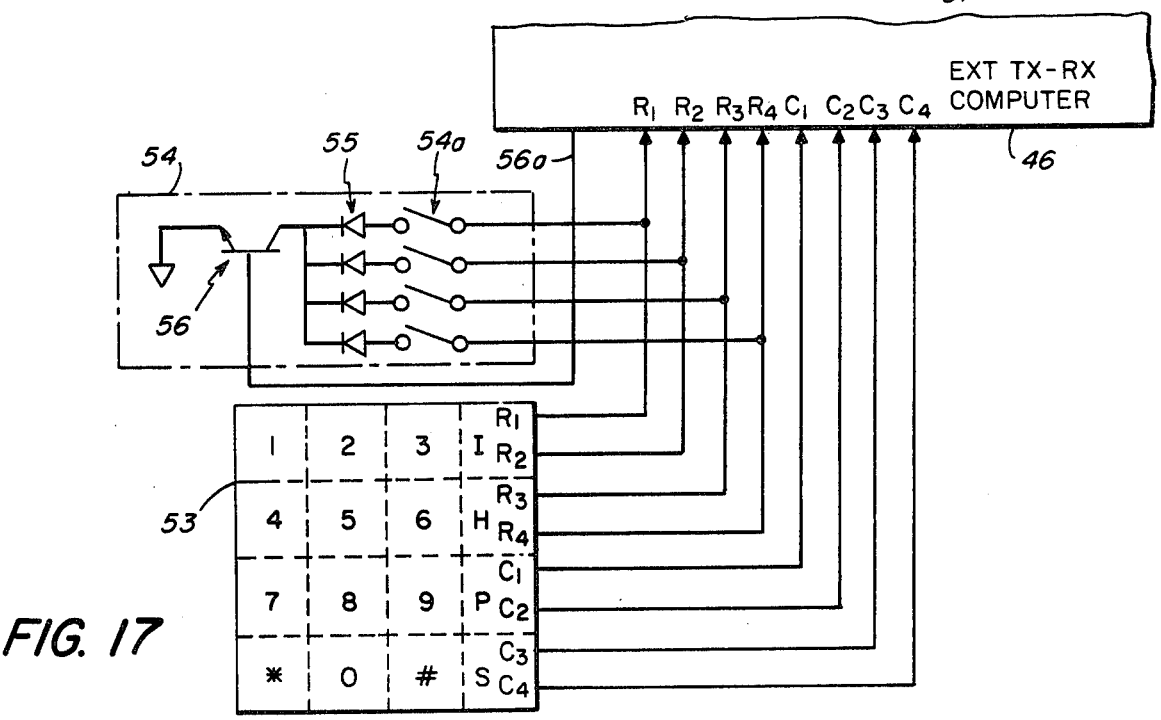

Operation of the address set switches 54 at the extension is much the same as the address set at the main, except that only a single bank of four switches is reqruied. As shown in FIG. 17 the bank of four switches 54a feed through diodes 55 and transistor 56 when the transistor is enabled by a signal in line 56a from the computer. In this case it is convenient to feed the impulse from the switches to the computer 46 via lines R1 to R4 from the extension keypad 53.

MAIN AND SYSTEM DTMF

As shown in FIG. 5, the main phone contains the system DTMF 36 that generates the conventional dual tones (Touch Tones) for dialing to the telephone line and the main DTMF 37 for doing the same.

Figure 18:
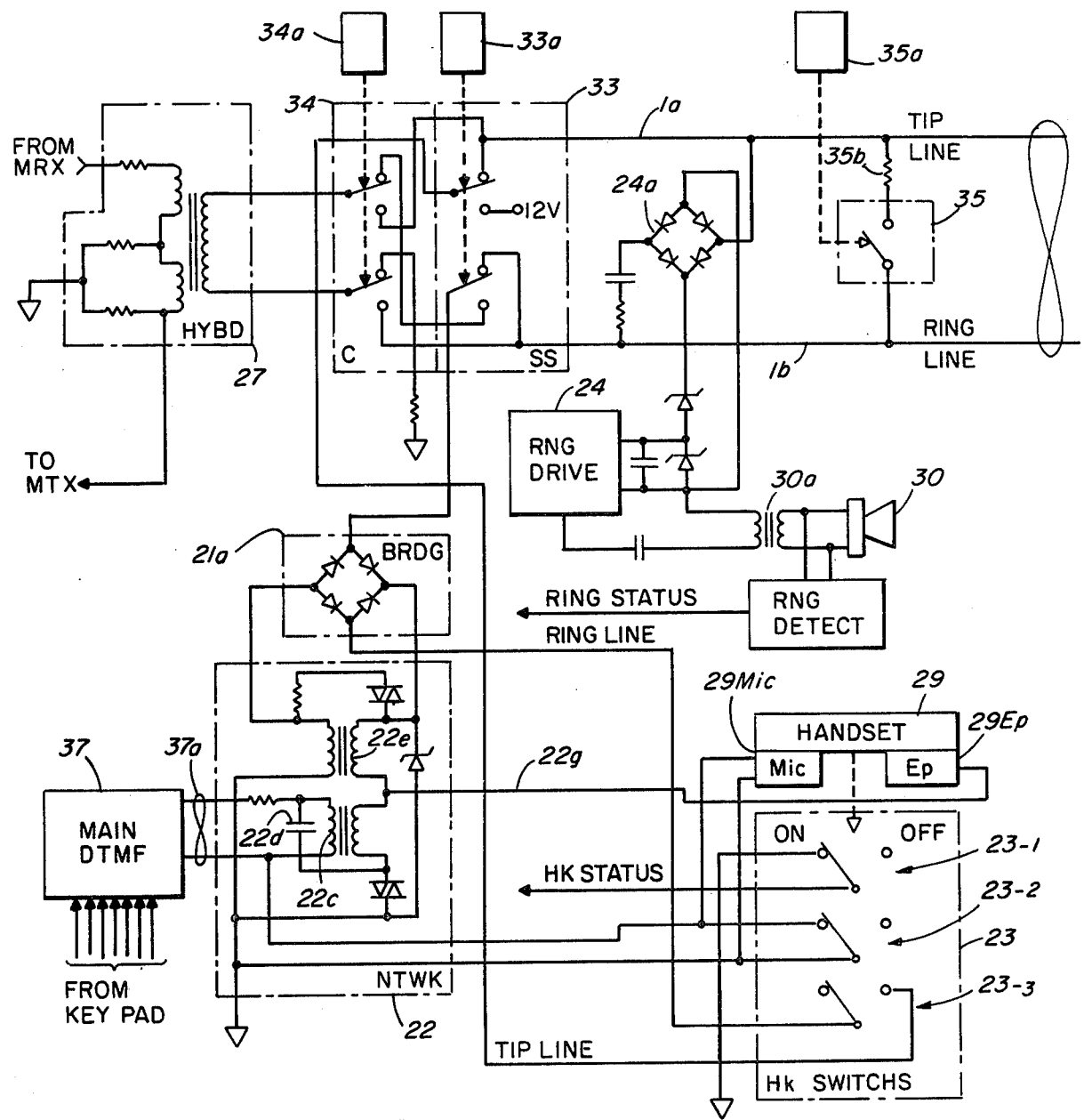
FIG. 18 shows electrical details of the dual (dial) tone multi frequency (DTMF) main and system generators in the main telephone.

The main DTMF feeds the telephone line interface 21 and is powered by the telephone line. It operates in conjunction with the main key pad 32, network 22 and hook switch 23, feeding tones to; one of the primary windings 22c of the network as the tones are dialed (called for) at the key pad. Details of these circuits and the connections and couplings between them are shown by FIG. 18. That figure shows details of network 22, hybrid 17, main hook switch 23 and the C, SS and H relay switches. The ports of network 22 and hybrid 27 are identified.

In FIG. 18, the tip line 1a connects through subset (SS) relay 33 and switch 23-3 of the hook switch set 23 to the balanced diode bridge circuit 21a. The ring line 1b connects through SS relay 33 directly to the diode bridge. Whichever line (the tip or ring) is at a positive voltage level with respect to the other is fed through the bridge to the Vbb terminal of the main DTMF, 37 and, correspondingly, whichever line is negative is fed through the bridge to the ground terminal, Vss of DTMF 37. In this way DTMF 37 is powered from the telephone line.

When DTMF 37 receives control input signals in lines R1 to R4 and C1 to C3 from the main key pad 32, it produces the appropriate tone combinations in output line 37a to the secondary winding 21c, 22 and across capacitor 21d of network 21.

These dial tones are coupled by transformer actions to the secondary 22e, which is across the tip and ring lines via the SS relay 33, and so the dial tones from the main subset are transmitted to the telephone line. A center top 22g on the primary 22e feeds the main handset 29 earphone 29 Ep. The main microphone 29 Mic also feeds across the primary winding 22c when handset 29 is off hook, except when dial tones are produced in the output of DTMF 37. The dial tones squelch the Mic via line 22f by turning on a transistor in the Mic (not shown). Thus, the main earphone produces audible dial tones and the main microphone is cut off when the operator dials.

CONCLUSIONS

The coding and decoding techniques for power line carrier communications at a subscriber's premises described herein with reference to FIGS. 1-3 has useful application to just about any multi-station power line carrier communication system and particularly those systems that operate within a residential premises where interference come from neighboring premises on the same side of the main power line transformer as the premises in question. The specific embodiment of the present invention, a multi-station power line telephone extension system is described to show the full use of all advantages of the coding and decoding techniques in such a power line telephone extension system. In addition, the specific embodiment teaches fully the implementation and use of other features referred to as Conventional, Hold, Intercom, Privacy, and Special in the multi-station system. Those features are described along to show fully the problems overcome and the advantages to be obtained by the practice of the present invention as set forth in the appended claims. Clearly other specific embodiments of such a multi-station system will be apparent to those skilled in the art without departing from the spirit and scope of the invention as set forth in the appended claims.

What is claimed is:

1. A System for signalling between stations on the power line in a building comprising,
   (a) a main station, denoted M, and one or more (up to N) satellite stations denoted E1, E2--En--EN.
   (b) a the M station:
       (b1) an M transmitter that transmits information signals as modulations of the carrier frequency Fm,
       (b2) N receivers, one for each of the satellite stations, each for receiving a corresponding one of the satellite carrier frequencies F1, F2,--Fn-FN, each receiver detecting the corresponding satellite station information signal modulations of the station carrier frequency Fn and producing an output, representative thereof,
       (b3) means for combining the outputs for said M receivers producing a combined receiver output signal, referred to herein as MRXN,
       (b4) means for coupling said MRXN to the input of the M transmitter, and
       (b5) means for coupling the inputs to the said N receivers and the output of the M transmitter to the power line in the building;
       (b6) whereby all information signals from the N receivers are transmitted over the power line on the carrier Fm; and
   (c) at each satellite station, En:
       (c1) an En receiver for receiving Fm,
       (c2) an En transmitter for transmitting information signals as modulations of the station carrier frequency Fn,
       (c3) a source of En information signals,
       (c4) an En received signal utilization device,
       (c5) means for coupling the En source output to the En transmitter input,
       (c6) means for coupling the En receiver output to the En utilization device, and
       (c7) means for coupling the input of the En receiver and the output of the En transmitter to the power line in the building;
   (d) whereby two or more of said satellite stations can communicate with each other simultaneously, full duplex.

2. A system as in claim 1, wherein the means at the M station for coupling the inputs of the N receivers and the output of the M transmitter to the power line of the building includes:
   (a) an M station input-output (RX-TX) transformer having primary and secondary sides,
   (b) an M station adaptor plug (AP) transformer having primary and secondary sides,
   (c) said M station RX-TX and AP transformers are coupled as follows:
       (c1) the inputs of each of the N receivers couple to the M RX-TX transformer,
       (c2) the output of the M transmitter couples to the M RX-TX transformer,
       (c3) one side of the M RX-TX transformer couples to one side of the M AP transformer and
       (c4) the other side of the M AP transformer connects to the power line.

3. A System as in claim 2 wherein the said other side of the M AP transformer is an inductance-capacitance circuit.

4. A System as in claim 2 wherein,
   (a) the M transmitter output couples to the other side of the M RX-TX transformer and
   (b) the inputs to each of the N receivers couple to the one side of the M RX-TX transformer.

5. A System as in claim 4 wherein, the inputs to each of the N receivers are in electrical series and said series is in electrical series with the said one side of the M RX-TX transformer.

6. A System as in claim 1 wherein all means at the M station are contained in at least two separate envelopes including a first and a second M envelope, of which the first contains the M transmitter, the N receivers and the M RX-TX transformer and the second contains the M AP transformer and the envelopes are connected by an electrical cable.

7. A System as in claim 6 wherein the second envelope has electrical contacts projecting there from for connection to the power line at a conventional power line receptacle and is of sufficiently small size and weight that it is held at the receptacle by the projecting contacts.

8. A System as in claim 7 and further including a source of power at the M station including:
   (a) an M power transformer (PT) having primary and secondary sides,
   (b) an M voltage regulator,
   (c) one side of the M PT connects to the power line and the other side connects to the M voltage regulator, and (d) the M voltage regulator is contained in the first envelope and the M PT is contained in the second envelope.

9. A System as in claim 1 wherein the means at each satellite station En for coupling the input of the En receiver and the output of the En transmitter to the power line of the building includes:
   (a) an En station input-output (RX-TX) transformer having primary and secondary sides,
   (b) an En station adaptor plug (AP) having primary and secondary sides,
   (c) said En station RX-TX and AP transformers are coupled as follows:
      (c1) the input to the En receiver couples to the En RX-TX transformer,
      (c2) the output of the En transmitter couples to the En RX-TX transformer,
      (c3) one side of the En RX-TX transformer couples to one side of the En AP transformer, and
      (c4) the other side of the En AP transformer connects to the power line.

10. A System as in claim 9 wherein,
    (a) the En transmitter output couples to the other side of the En RX-TX transformer, and
    (b) the input to the En receiver couples to one side of the RX-TX transformer.

11. A System as in claim 10 wherein, the input of the En receiver is an electrical series with said one side of the En RX-TX transformer.

12. A System as in claim 9 wherein, all means at the En station is contained in at least two separate envelopes, including first and second En envelope, of which the first contains the En transmitter, the En receiver and the En RX-TX transformer and the second contains the En AP transformer and the envelopes are connected by an electric cable.

13. A System as in claim 11 wherein the second envelope has electrical contacts projecting therefrom for connection to the power line at a conventional power line receptacle and is of sufficiently small size and weight that it is held at the receptacle by the projecting contacts.

14. A power line RF carrier telephone extension system for signalling between (1) a telephone subscriber's telephone line of a conventional telephone communication system wherein a separate telephone line is provided from a central switching system at one location to each subscriber at the subscriber's premises and each subscriber's telephone line includes at least two wires, the ring line and the tip line and, (2) each of one or more extension telephones by RF carrier over the available power line at the subscriber's premises, including at the subscriber's premises: a subscriber main station (M) near said subscriber telephone line and having access to said power line and one or more (up to N) subscriber extension stations (E1, E2 ---En--- EN), each having access to said power line, comprising,
    (a) at the M station:
        (a1) means connected to the telephone line for detecting audio frequency signals on the telephone line, referred to herein as TL signals,
        (a2) an M transmitter including means for producing a main carrier frequency, Fm, and modulating means for modulating Fm,
        (a3) N receivers, one for each of the En stations, each receiver for receiving a different one of the En stations transmitted RF carrier frequencies, $F_1, F_2 -- F_n --- F_N$ and including an $F_n$ demodulator, and producing modulations of Fn in the output thereof,
        (a4) means for combining the outputs of said N receivers, producing a combined receiver output signal, referred to herein as MRXN,
        (a5) means for combining the detected TL and MRXN signals and, coupling the combined signals to the input of the transmitter, said transmitter input of the transmitter, said transmitter input being referred to herein as MTX, and
        (a6) means for coupling the transmitter output to the power line,
    whereby the power line carries the modulated Fm to the NE stations; and
    (b) at each E station, denoted generally as En:
        (b1) an En telephone,
        (b2) a source of power for the En telephone, whereby the En telephone produces audio and dial signals when it is used,
        (b3) an En receiver for modulated Fm including an Fm demodulator, and producing the modulations of Fm in the output thereof, referred to herein as EnRX,
        (b4) means for coupling modulated Fm from the power line to the input of the receiver and
        (b5) means for coupling said EnRX to the En telephone,
    whereby the En telephone receives the TL and MRXN signals,
        (b6) the extension telephone producing information signals, which may include audio and data signals, and dial signal and a telephone line hold signal when it is used by the subscriber,
        (b7) an En transmitter including means for producing the En telephone carrier frequency, Fn and modulating means for modulating Fn by the En telephone audio signals and signals representative of the En dial signals and hold signal producing modulated Fn and (b7) means for coupling the modulated Fn to the power line,
    whereby the power line carries the modulated Fn to the main station and telephone calls from the telephone line can be answered by any of the $E_1, E_2 -- E_n --- E_N$ telephones and telephone calls can be made to the telephone line by any of the $E_1, E_2 -- E_n --- E_N$ telephones and any or all of the $E_1, E_2 -- E_n$ telephones can conference on a telephone line call.

15. A System as in claim 14, wherein the means at the M station for coupling the inputs to the receivers and the output of the M transmitter to the power line of the building includes:
    (a) an M station input-output (RX-TX) transformer having primary and secondary sides,
    (b) an M adaptor plug (AP) transformer having primary and secondary sides,
    (c) said M station RX-TX and AP transformers are coupled as follows:
        (c1) the inputs into each of the N receivers couple to the M RX-TX transformer,
        (c2) the output of the M transmitter couples to the M RX-TX transformer,
        (c3) one side of the M RX-TX transformer couples to one side of the M AP transformer and
        (c4) the other side of the M AP transformer connects to the power line.

16. A System as in claim 15 wherein the said other side of the AP transformer is an inductance-capacitance circuit.

17. A System as in claim 15 wherein,
 (a) the M transmitter output couples to the other side of the M RX-TX transformer and
 (b) the inputs to each of the N receivers couple to the one side of the M RX-TX transformer.

18. A System as in claim 17 wherein, the inputs to each of the M receivers are in electrical series and said series is in electrical series with the said one side of the M RX-TX transformer.

19. A System as in claim 18 wherein all means at the M station are contained in at least two separate envelopes including a first and a second M envelope, of which the first contains the N transmitter, the M receivers and the M RX-TX transformer and the second contains the M AP transformer and the envelopes are connected by an electrical cable.

20. A System as in claim 19 wherein the second envelope has electrical contacts projecting there from for connection to the power line at a conventional power line receptacle and is of sufficiently small size and weight that it is held at the receptacle by the projecting contacts.

21. A System as in claim 20 and further including a source of power at the M station including:
 (a) an M power transformer having (PT) primary and secondary sides,
 (b) an M voltage regulator,
 (c) one side of M PT connects to the power line and the other side connects to the M voltage regulator, and
 (d) the M voltage regulator is contained in the first envelope and the M PT is contained in the second envelope.

22. A System as in claim 14 wherein the means at each of the E stations (En) for coupling the input of the receiver and the output of the transmitter to the power line of the building includes:
 (a) an En station input-output (RX-TX) transformer having primary and secondary sides,
 (b) an En station adaptor plug (AP) having primary and secondary sides,
 (c) said En station RX-TX and AP transformers are coupled as follows:
  (c1) the input to the En receiver couples to the En RX-TX transformer,
  (c2) the output of the En transmitter couples to the En RX-TX transformer,
  (c3) one side of the En RX-TX transformer couples to one side of the En AP transformer, and
  (c4) the other side of the En AP transformer connects to the power line.

23. A System as in claim 22 wherein,
 (a) the En transmitter output couples to the other side of the En RX-TX transformer, and
 (b) the input to the En receiver couples to one side of the En RX-TX transformer.

24. A System as in claim 23 wherein, the input of the En receiver is an electrical series with said one side of the En RX-TX transformer.

25. A System as in claim 22 wherein, all means at the En station is contained in at least two separate envelopes, including a first and a second En envelope of which the first contains the En transmitter, the En receiver and the En RX-TX transformer and the second contains the En AP transformer and the envelopes are connected by an electric cable.

26. A System as in claim 24 wherein the second envelope has electrical contacts projecting therefrom for connection to the power line at a conventional power line receptacle and is of sufficiently small size and weight that it is held at the receptacle by the projecting contacts.

27. A telephone extension system for signalling between (1) a telephone subscriber's telephone line of a conventional telephone communication system wherein a separate telephone line is provided from a central switching system at one location to each subscriber at the subscriber's premises and each subscriber's telephone line includes at least two wires, the ring line and the tip line and, (2) each of one or more extension telephones by RF carrier over transmission line line at the subscriber's premises, including at the subscriber's premises: a subscriber main station (M) near said subscriber telephone line and having access to said transmission line and one or more (up to N) subscriber extension stations (E1, E2 ---En--- EN), each having access to said transmission line, comprising,
 (a) at the M station:
  (a1) means connected to the telephone line for detecting audio frequency signals on the telephone line, referred to herein as TL signals,
  (a2) an M transmitter including means for producing a main carrier frequency, Fm, and modulating means for modulating Fm,
  (a3) N receivers, one for each of the En stations, each receiver for receiving a different one of the En stations transmitted RF carrier frequencies, F1, F2-- Fn---FN and including an Fn demodulator, and producing modulations of Fn in the output thereof,
  (a4) means for combining the outputs of said N receivers, producing a combined receiver output signal, referred to herein as MRXN,
  (a5) means for combining the detected TL and MRXN signals and, coupling the combined signals to the input of the transmitter, said transmitter input being referred to herein as MTX, and
  (a6) means for coupling the transmitter output to the transmission line,
 whereby the transmission line carries the modulated Fm to the NE stations; and
 (b) at each E station, denoted generally as En:
  (b1) an En telephone,
  (b2) a source of power for the En telephone, whereby the En telephone produces audio and dial signals when it is used,
  (b3) an En receiver for modulated Fm including an Fm demodulator, and producing the modulations of Fm in the output thereof, referred to herein as EnRX,
  (b4) means for coupling modulated Fm from the transmission line to the input of the receiver and
  (b5) means for coupling said EnRX to the En telephone,
 whereby the En telephone receives the TL and MRXN signals,
  (b6) the extension telephone producing information signals, which may include audio, dial and command signals when it is used by the subscriber,
  (b7) an En transmitter including means for producing the En telephone carrier frequency, Fn, and modulating means for modulating Fn by the En telephone audio signals and signals representative of the En dial signals producing modulated Fn and command (b7) means for coupling the modulated Fn to the transmission line, whereby the transmission line carries the modulated Fn to the main station and telephone calls from the telephone line can be answered by any of the $E_1, E_2$ -- $E_n$---EN telephones and any or all of the $E_1, E_2$ --$E_n$---EN telephones can conference on a telephone line call.

28. A System as in claim 27 wherein,
   (a) each dial and command signal produced at an E station is a digital code word consisting of several binary bits that signify the dial or command signal by the E station,
   (b) whereby the said signal code word is modulated by the E station carrier frequency (Fn) and launched onto the transmission line at the station, and
   (c) means are provided at the M station for storing the signal code word, for comparing the detected code word with the stored code word and for controlling a dialing or command device depending upon said comparison,
   (d) whereby only code words that satisfy said comparison are effective to accomplish the dialing or command.

29. A system as in claim 28 and further including:
   (a) means at the E station for producing and adding to each dial and command code word to be transmitted a digital address word, called the address word to preceed the code word in time and to consist of several binary bits that signify the address of the E station,
   (b) whereby the address word followed by the code word is modulated by the E station carrier frequency and launched onto the transmission line at the station, and
   (c) means are provided at the M station for storing the address codes of the E stations, for detecting such address words from the received RF carrier, for comparing such detected address words with the stored address codes and for controlling the detection of the received signal depending upon said comparison,
   (d) whereby only dial and command code signals preceeded by a stored address code are detected at the M station.

30. A System as in claim 29 and further including,
   (a) means at the E station for producing and adding a digital check word called the check word, following an address word and a dial or command word and consisting of several binary bits that signify a predetermined combination of the preceeding address and dial or command words,
   (b) whereby the address word followed by the code word followed by the check word are modulated by the E station carrier frequency and launched onto the transmission line at the TX station, and
   (c) means at the M station for combining the detected address and dial or command code words and comparing the combination with the detected check word and for controlling the detection of the received signal depending upon said comparison,
   (d) whereby only dial or command code words preceeded by address and followed by check words for which the detected address and code words combine to compare in the predetermined combination manner with the detected check word are detected.

31. A System as in claim in 27 wherein,
   (a) the RF carrier modulation by the information signals that are analog (such as the audio) is frequency modulation, the RF carrier modulation by the binary bits is digitally modulated frequency shift keying, and
   (b) the percent modulation of the binary bits is greater than the percent modulation of the analog signal.

32. A System as in claim 31 wherein,
   (a) each binary bit has a value of binary "1" or binary "0" and is represented by one of two states of the RF carrier transmission,
   (b) the two states are on and off, and
   (c) each bit is represented by a combination of both on and off states, the combination for "1" bit being different than the combination for "0" bit, and
   (d) whereby each bit is initiated by a switching in state of the transmitter between the on and off states.

33. A System as in claim 32 and further including,
   (a) means at the M station for integrating received RF carrier over the time interval of each bit, and
   (b) means responsive thereto for determining the value of the bit.

* * * * *

UNITED STATES PATENT AND TRADEMARK OFFICE
CERTIFICATE OF CORRECTION

PATENT NO. : 4,475,193
DATED : Oct. 2, 1984
INVENTOR(S) : William M. Brown

It is certified that error appears in the above—identified patent and that said Letters Patent is hereby corrected as shown below:

Claim 1 - Col. 29, line 45, delete "a" and insert ---at---.

Claim 14 - Col. 32, lines 8-9, delete "said transmitter input of the transmitter,".

Claim 27 - Col. 34, line 13, delete "line" second occurrence.

Claim 31 - Col. 36, line 22, delete "in" second occurrence.

Signed and Sealed this

Fourteenth Day of May 1985

[SEAL]

Attest:

DONALD J. QUIGG

Attesting Officer    Acting Commissioner of Patents and Trademarks